(12) United States Patent
Tadepalli et al.

(10) Patent No.: US 8,962,735 B2
(45) Date of Patent: Feb. 24, 2015

(54) METHODS OF MAKING REACTIVE FIBER/FLAKE PREPREGS AND REACTIVE PREPREGS

(75) Inventors: Rajappa Tadepalli, Highlands Ranch, CO (US); Klaus Friedrich Gleich, Highlands Ranch, CO (US); Jawed Asrar, Englewood, CO (US); Kiarash Alavi Shooshtari, Littleton, CO (US)

(73) Assignee: Johns Manville, Denver, CO (US)

( * ) Notice: Subject to any disclaimer, the term of this patent is extended or adjusted under 35 U.S.C. 154(b) by 557 days.

(21) Appl. No.: 13/335,690

(22) Filed: Dec. 22, 2011

(65) Prior Publication Data
US 2013/0165585 A1  Jun. 27, 2013

(51) Int. Cl.
*C09D 177/02* (2006.01)
*B27N 3/00* (2006.01)

(52) U.S. Cl.
USPC .......................... 524/494; 524/606; 156/62.2

(58) Field of Classification Search
CPC ... C08F 226/06; B29C 70/086; B29C 70/088; B29C 70/504; B29C 70/506; B29C 71/0009; B29C 2071/0018; C08J 5/24
USPC .................................. 524/494, 606; 156/62.2
See application file for complete search history.

(56) References Cited

U.S. PATENT DOCUMENTS

| | | | |
|---|---|---|---|
| 3,163,689 A * | 12/1964 | Ives | 264/510 |
| 5,240,974 A | 8/1993 | Lechner et al. | |
| 2006/0057319 A1 * | 3/2006 | Gleich et al. | 428/35.2 |
| 2010/0305269 A1 * | 12/2010 | Gleich et al. | 524/606 |

* cited by examiner

*Primary Examiner* — Ling Choi
*Assistant Examiner* — Chun-Cheng Wang
(74) *Attorney, Agent, or Firm* — Robert D. Touslee

(57) ABSTRACT

Prepreg compositions and methods of making them from particles and a binder composition are disclosed. The methods may include placing the particles on a moving conveying belt and applying the binder composition to the particles on the moving conveying belt to form a moving mass. Alternate methods may include first placing the binder composition on the moving conveying belt and then applying the particles to the binding composition to form the moving mass. The methods may further include passing the moving mass through one or more pairs of opposed, compacting rolls, where the particles and the binder composition are pressed into further contact while passing through the compacting rolls to form the prepreg. The binder composition in the prepreg may include monomers and/or oligomers of a polymer that are capable of polymerizing into the polymer under polymerization conditions.

24 Claims, 6 Drawing Sheets

METHODS OF MAKING REACTIVE FIBER/FLAKE PREPREGS AND REACTIVE PREPREGS

Prepregs of particle reinforced composites and methods of making the composites are described. The prepregs may include a binder component, such as monomers and/or oligomers that are capable undergoing additional polymerization when the prepreg is exposed to polymerization conditions. The prepregs may further include a particle component, such as organic or inorganic fibers and/or flakes. The particles may be treated with a composition such as a catalyst or polymerization initiator (PI) that encourages the polymerization of the binder component under the polymerization conditions.

BACKGROUND OF THE INVENTION

Processes may be used for making reinforcements including chopped fiber strands, fiber strand rovings and yarn, chopped strand mat, nonwoven fibrous mats, woven fabrics and scrims. Reinforcements may be used with plastics to strengthen and stabilize plastic composites. Processes may also be used for making flakes, like glass flakes, and filler and pigment particles for stabilizing and/or coloring pigments for use in plastics to, texture, stabilize and color plastic composite parts and products. Prepregs may be made either in sheets, bulk slugs, preformed shapes, etc. containing one or more monomers with or without reinforcements and/or flakes and/or filler and/or pigment particles and to keep the prepregs cool, below the polymerization temperature of the monomer(s) until the desired time to form and/or to heat the monomer(s) to polymerize and form a plastic composite.

Forming processes may be used to form small to large and/or structural glass fiber reinforced and/or stabilized and/or colored plastic composite parts or products containing a thermoplastic polymer or a thermoset polymer, or a combination of the two, and one or more of these containing fibrous reinforcements, filler and/or pigment include matched metal die molding, hydrostatic molding, vacuum bag molding, injection molding, resin transfer molding (RTM), reaction injection molding (RIM), vacuum resin transfer transfer molding (VARTM) and other molding techniques.

As the new CAFÉ gas mileage standards introduced, there is a larger than ever need for lighter weight vehicle parts that thermoplastic and reinforced thermoplastic (TPFRC) could satisfy, because TPFRC scrap is recyclable. The thermoplastic polymers copolymers or homopolymers may be melted and reclaimed and ground thermoplastic TPFRC may be used in thermoplastic forming processes including injection molding, extrusion, etc. Thus, there is a large need for TPFRC parts like the thermoset plastic reinforced (TSFRC) parts and products made using thermoset processes including RIM, SRIM, RTM, VARTM, LFI (long fiber injection molding), SMC, BMC, Currently, such tendency to form branching and/or cross-linking polymerization in these processes while in the extruder and/or in the injection molding system prior to the mold when using reactive materials causes increases in viscosity and shear resistance that is extremely costly if not prohibitive to the use of such reactive materials in these processes. If ways could be found to polymerize and form the thermoplastic polymers, copolymers and homopolymers in situ surrounding the fiber reinforcements, filler and/or pigment in molds of processes, it would be a valuable advancement.

Low viscosity caprolactam monomers, one containing an activator and another mixture containing a caprolactam monomer and a catalyst may be cast by mixing the two very low viscosity mixtures together prior to casting. However, this mixture should be kept to less than about 100° C. to prevent rapid polymerization. Following casting, the cast mixture is heated in the mold to cause anionic polymerization of the monomer to produce a polyamide. However, this method is not practical for most vehicle and large parts and many other current thermoset parts because of the relatively low temperature limitation and the time delays that are caused in the forming and polymerizing cycle. If TPFRC is to replace metals or TSFRC substantially in the automotive industry and elsewhere, economical method(s) need to be found that will produce such automotive parts of equal or superior performance at competitive costs with metal and TSFRC parts now in use.

BRIEF SUMMARY OF THE INVENTION

Reactive prepregs that allow the processes that use prepregs to make thermoplastic composites, thermoset composites, and laminates whether fiber reinforced or unreinforced and/or particle stabilized or not stabilized and/or colored or not colored composites in a faster, less costly, more economical and more timely manner are described. The prepregs contain all the materials needed for the polymerization of various monomers and resins including one or more polymerization initiators (PI)/(PI's), one or more polymerization catalysts, or both, or one or more precursors of the PI(s) and/or catalyst(s). Following molding to shape in either room temperature or heated molds, the molded shapes, either in the mold(s) or removed from the mold(s), are polymerized by heating, for example, in an oven or an autoclave.

In present embodiments, the prepregs contain reactive reinforcing fibers and/or reactive flakes and/or reactive particles of filler and/or pigment that have been made reactive because they have, chemically or mechanically bonded to their surfaces, a residue of one or more PI(s) or one or more catalysts. The reinforcing reactive fibers and/or flakes and/or particles are surrounded with a thermoplastic or thermoset monomer containing one or more PI(s) or one or more catalyst(s), i.e. catalyst(s) where the reactive compound(s) on the fibers and/or flakes and/or particles is a/are PI(s) and PI(s) where the reactive compound(s) on the fibers and/or flakes and/or particles is a/are catalyst(s).

The catalyst(s) may include those compounds that will cause polymerization of the monomer when in contact with the monomer and one or more PI's and when the temperature is in the range of about 150° C. to about 450° C. Instead of one or more PI's and/or one or more catalysts, promoters, precursors of such may be present for any PI or any catalyst, promoter. The precursors may include any compound(s) that will react to form the PI or catalyst when heated to the polymerization temperature, or an elevated temperature above room temperature, but below the polymerization temperature.

Present embodiments include methods of making the prepregs described above including the steps of preparing a mixture comprising one or more monomers, one or more PI(s) or one or more catalysts, the PI(s) or catalysts either being alone or on the surfaces of one or more of reactive fibers, reactive flakes and/or reactive particles. This mixture, cooled to a temperature below that at which the monomer would polymerize in the presence of a PI, is then rolled out into a sheet of any desired width while keeping the monomer mixture sheet at a temperature below its polymerization temperature, i.e. at a temperature at which no significant polymerization will take place, until it is ready cut to size and/or mold to shape, and then is heated to polymerize the one or more monomers to form a composite part or product. In the above phrase, "no significant" polymerization will take place," the words "no significant polymerization" means less than 5% of the monomer has been converted to oligomers or polymers. When it is desired to form a reinforced composite, the mixture is rolled onto, poured onto or otherwise impregnated into, with or without running through compaction rollers to cause the monomer mixture to wet out the continuous and/or chopped fibers in the form of loose, chopped fibers and/or chopped strands of fibers, fibrous nonwoven mats and/or fibrous woven fabrics and/or fibrous preforms. The reinforcements may be reactive or unreactive. Following masuration and/or other techniques of surrounding the fibers with the monomer mixture, the reinforced prepreg is cut to a desired size or rolled up, in either case with separator sheets used between layers of the prepreg to prevent sticking and kept below 30° C. to prevent polymerization until the time that polymerization is desired.

Further embodiments include production of multi-layer pregregs, in these or slightly modified forming systems, allowing the forming of laminates in which a strong, rigid, reinforced or unreinforced, stabilized and/or unstabilized and/or colored or not colored, thermoset or an elastomeric thermoplastic polymer layer, core layer or core may be protected by one or more layers of, sandwiched between two layers of, or surrounded by a layer of, tough, elastomeric reinforced or unreinforced, stabilized and/or un-stabilized and/or colored or not colored elastomeric thermoplastic polymer, or a hard, rigid reinforced or unreinforced, stabilized and/or un-stabilized and/or colored or not colored thermoset polymer. The multi-layer pregregs may be made by laying one or more thermosetting prepreg sheets on top of either a thermosetting prepreg or a thermoplastic pregreg, or vice versa, to make an intermediate laminate pre-greg containing any combination of prepreg layers for later molding and heating to polymerize and bond the layers together to form composite laminates. Alternatively, a second, and any additional prepreg layer, may be formed on top of a previously formed pregreg layer, made as described above, and alternatively repeated as desired number of times, to produce the intermediate laminate prepreg. In any of these methods, at least one layer of the intermediate laminate pregreg may contain reactive fibers and/or reactive flakes and/or reactive particles. The intermediate laminate pregreg may be kept cool, molded and heated.

Polymer initiator(s) PI(s) and/or catalysts may be used on the surfaces of the reinforcing fibers and flakes, and/or particles of fillers and/or pigments made reactive with the PI(s) and/or catalysts initiating polymerization of monomer(s) to produce polyamides, polyesters, (PBT), polyurethanes and other polymers including thermoplastic polymers whose monomers may be included in the pre-polymerized mixture, including polybutylene terephthalate (PBT), polyethylene terephthalate (PET), polyamide-6 (PA-6), polyamide-12 (PA-12), polyimide-6,6 (PA-6,6), cyclic poly(1,4-butylene tereph-thalate) (CBT), polyurethanes (TPU), polymethylmethacrylate (PMMA), polycarbonates (PC), polyphenylenesulphide (PPS), polyethylenenapthalate (PEN), polybutylenenaphthalate (PBN), polyether etherketone (PEEK), and polyetherketoneketone (PEKK), and combinations of two or more of these polymers, among other polymers. When polymerizing a PBT system the reactive fibers and/or flakes and/or particles do not have a PI on their surfaces, only one or more catalysts for polymerization of PBT are on their surfaces. Not having to mix a catalyst with the PBT before forming is a valuable improvement due to the tendency for the PBT to polymerize prematurely.

Reinforcing fibers coated with a PI and/or a catalyst may also polymerize cyclic olefin monomers. Cyclic olefin monomers may undergo ring-opening metathesis polymerization (ROMP) under catalytic conditions. ROMP catalysts may include rhodium, rhenium, or molybdenum catalysts developed by Schrock or Grubbs. Cyclic olefin monomers such a norbornene, cyclopentadiene, cyclooctadiene, decyclopentadiene, etc. may participate in the ROMP reaction to yield polymers.

The PI(s) may be coupled on non-coupled. The PI(s) for polyamide may be isocyanate-based or non-isocyanate-based. PBT to polyester systems may not use a PI, so only a catalyst may be necessary on the surfaces of the fibers and flakes to polymerize the cyclic poly(1,4-butylene terephthalate) (CBT) monomer to cyclic PBT. Suitable catalysts include tin-containing compounds and/or titanium-containing compounds. For example the catalysts may include organotin and/or organotitanate compounds. Tin-containing compounds may include monoalkyltin(IV) hydroxide oxides, monoalkyltin(IV) chloride dihydroxides, dialkyltin(IV) oxides, bistrialkyltin(IV) oxides, monoalkyltin(V) tris-alkoxides, dialkyltin(IV) dialkoxides, and trialkyltin(IV) alkoxides, among other tin-containing compounds. Exemplary titanium-containing compounds include titanate tetraalkoxide compounds (e.g., tetraisopropyl titanate) and tetraalkyl titanate compounds (e.g., tetra(2-ethylhexyl) titanate), among others.

For polyurethane, epoxy or other blocked isocyanates including blocking agents such as oximes such as methyl ethyl ketoxime, acetone oxime, and cyclohexanone oxime, lactams such as epsilon-caprolactam, and pyrazoles may be used as PI's. Precursors thereof and isocyanates including blocked trimethylene diisocyanate, blocked tetramethylene diisocyanate, blocked hexamethylene diisocyanate, blocked butylidene diisocyanate, blocked isophorone diisocyanate, blocked methyldiphenyl diisocyanate, blocked toluene diisocyanate, blocked 1,4-cyclohexane diisocyanate, blocked hexamethylene diisocyanurate, blocked hexamethylene diisocyanate biuret and combinations thereof may also be used. The blocked-isocyanate PIs or the precursors thereof may also comprise a silane end-group for coupling to the glass surface.

Reactive materials including fibers and/or flakes and/or filler particles and/or pigment particles may be used with thermosetting materials. The latter includes thermosetting materials used with the reactive materials described above having one or more materials on their surfaces that will, at the appropriate temperatures cause the thermosetting materials to polymerize to form reinforced thermoset composites or laminates containing one or more layers of thermoset composite with or without being in contact with one or more layers of a thermoplastic composite.

Present embodiments include the use of reactive reinforcing fibers and/or flakes and/or particles of fillers and or particles of pigments sized with sizing compositions, the dried residue thereof, on their surfaces. Embodiments also include fiber reinforcements including glass fibers or flakes and particles of fillers and pigments sized using sizing compositions containing one or more PI (s), precursors thereof or catalyst(s) for causing polymerization of various monomers to form polymers including polyamide 6, polyester (PBT), polyurethanes and other polymers to size reinforcing fibers or flakes to produce reactive reinforcing fibers and flakes.

When a heated monomer comes into contact with the reactive reinforcing fibers and/or flakes, containing one or more catalyst(s) or one or more PI (s), or precursor(s) thereof, polymerization begins and proceeds to form the polymer. In present embodiments it may not be necessary to put one or more PI(s) or one or more catalyst(s) in separate monomer (i.e. two separate pots) to produce composite parts in the above described processes. This is accomplished by placing one or more polymerization (PI's), or one or more precursors of such PI(s) onto the reinforcing fibers and/or flakes as one, or two separate coatings, and combining low viscosity thermoplastic monomers including caprolactam, polybutelene terathylate (PBT) and others, and optionally using mixtures of such monomer(s) containing one or more catalysts, including butylchlorotin dihydroxide, tetraisopropyl titanate, tetramethylammonium tetraphhenyl borate, compounds containing tertiary amines or quarternary ammonium salts, and organotin and/or organotitanate compounds. Tin-containing compounds may include monoalkyltin(IV) hydroxide oxides, monoalkyltin(IV) chloride dihydroxides, dialkyltin(IV) oxides, bistrialkyltin(IV) oxides, monoalkyltin(V) tris-alkoxides, dialkyltin(IV) dialkoxides, and trialkyltin(IV) alkoxides, among other tin-containing compounds. Exemplary titanium-containing compounds include titanate tetraalkoxide compounds (e.g., tetraisopropyl titanate) and tetraalkyl titanate compounds (e.g., tetra(2-ethylhexyl) titanate), among others for PBT. Compounds represented as Y—(X)$_n$-A, where Y is either a coupling moiety for bonding with the surfaces of the fibers and/or flakes, e.g. glass, A is ring-opening polymerization catalyst or initiator moiety capable of participating in a ring-opening polymerization of a monomer when exposed to ring-opening polymerization conditions, and X is a linking moiety capable of linking the Y moiety to the A moiety chemically. The n is an integer ranging from zero to 3. When n is zero, then the catalyzing moiety itself is capable of coupling with the reinforcement surface. In another version of this compound, Y could also be replaced with A, in which case it is not necessarily coupled to the reinforcement surface. Examples of initiators for polymerizing polyamides include N-hexamethyldiisocyanato-capped caprolactam, N-acetylcaprolactam, Isophthaloylbiscaprolactam, Isocyanatopropyltriethoxysilane-capped caprolactam and others including caprolactam esters such as benzoyl caprolactam, reaction products of acryloyl/methacrylol caprolactam with amino/mercapto silanes or non-silane amines/thiols, compounds/reaction schemes depicted by

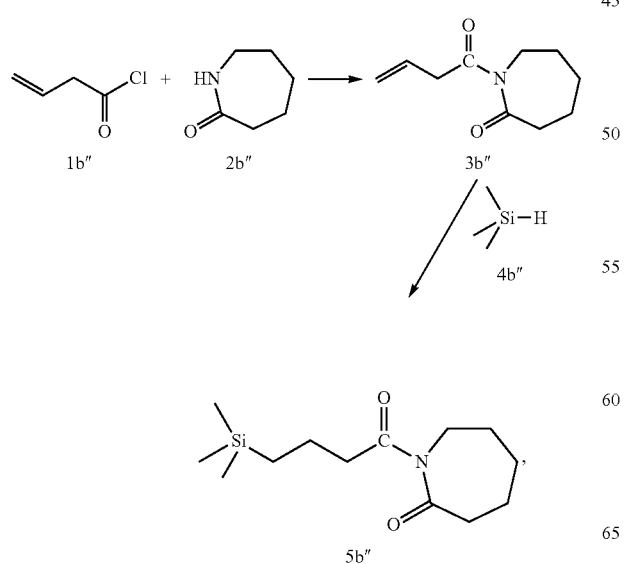

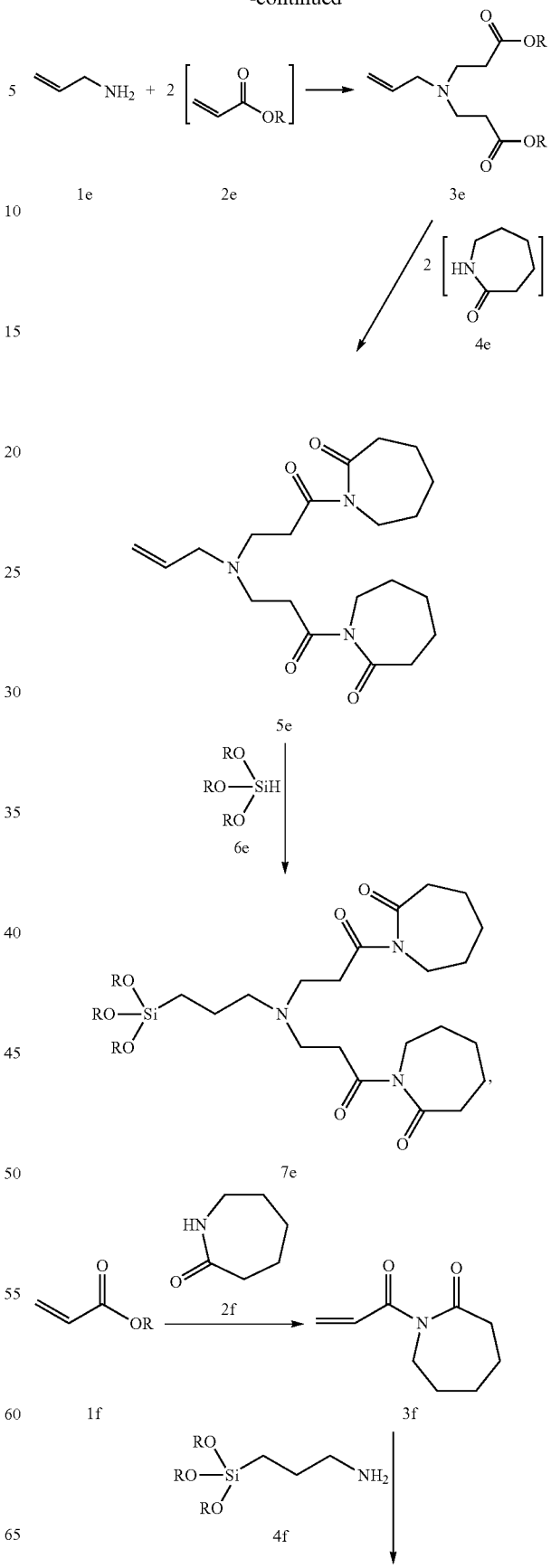

-continued

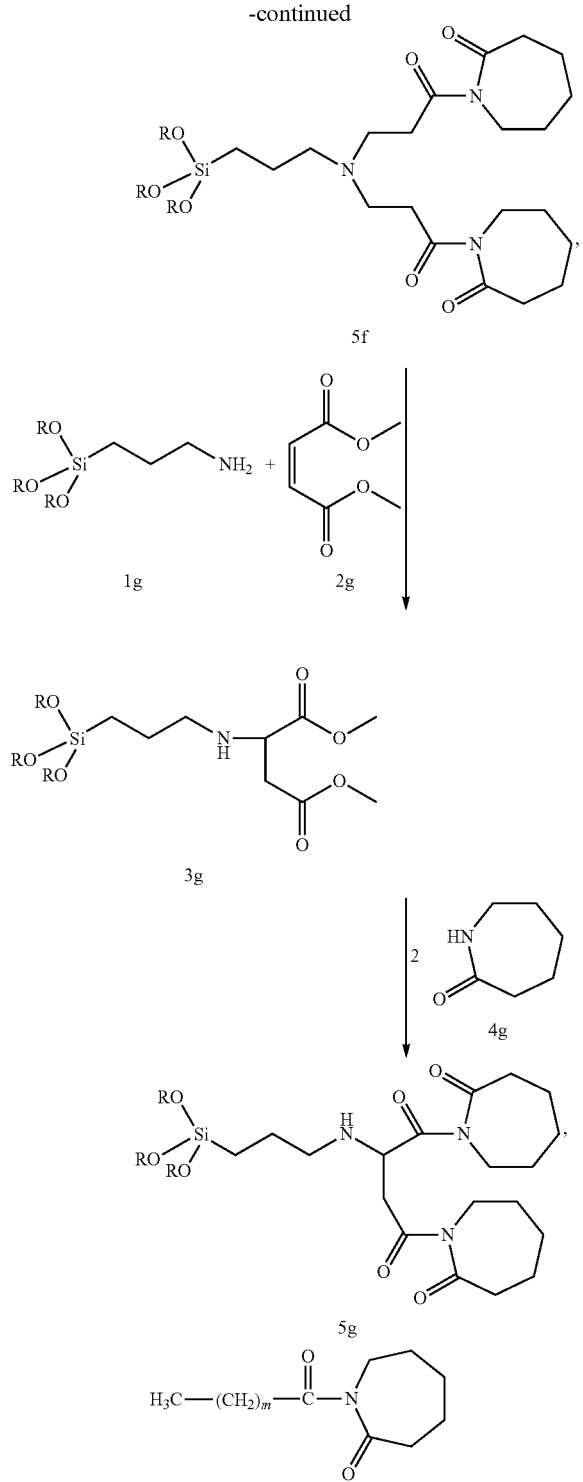

where m is a integer with a value of 0 to 12, or any initiator depicted by

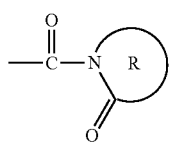

wherein

represents a C3 to C12 substituted or unsubstituted cyclic hydrocarbon chain.

Cyclized PBT oligomer is converted to linear PBT in the range of about 180 to about 200° C. in the presence of a catalyst. The elevated temperatures for polymerization of the caprolactam monomers may be optionally in the range of about 110° C. for a few minutes, up to about 5-10 minutes to complete or complete sufficiently the reaction(s) to form the activator in situ, before raising the temperature to the following higher levels. In alternative embodiments, the temperature may initially be about 140° C. to about 200° C., about 150° C. to about 180° C., or about 150° C. to about 170° C., to cause the anionic polymerization of at least about 90 percent (for example, more than 97 percent) of the monomer(s) resulting in a similar percentage of polycrystalline polyamide or other polymer.

Present embodiments of the methods also include methods of making reinforced thermoset composites such as laminates of all types including unsaturated polyesters, vinyl esters and acrylates that cure via free radical polymerization as one or more layers of the laminates. Reactive sizing on the surfaces of the reinforcing fibers and/or flakes may comprise either one or more catalysts or one or more PI(s) physically or chemically bonded to the surfaces. The catalysts may include metal salts, amines, thiols, acids and combinations thereof. Free radical PI(s) include hydroperoxides.

Embodiments may include having one or more PI(s) present on the surfaces of the reinforcement fibers and/or flakes. Exemplary fibers and/or flakes are glass, such as E glass, however a broad range of materials suitable for the reinforcement fibers and/or flakes are disclosed below. In some of the embodiments one or more catalysts may also be present in the sizing composition and on the surfaces of the reinforcing fibers and/or flakes. The present sizing compositions may include a liquid and either one or more PI(s) or one or more precursors of such one or more PI(s) either in a single coating or in two or more coatings, methods of making reactive reinforcements having such coatings, and the reactive reinforcements having such coating(s).

The present methods simplify the RTM, RIM, VARTM/RIM, (vacuum assisted RTM or RIM), pultrusion, injection molding and filament winding systems and processes by placing the PA and/or catalyst on the surface of the reinforcement fibers and/or flakes. For example, the need for the cost and added complexity of the equipment needed such as additional resin tanks, heaters, pumps, lines, valves, mixers, etc., and the elimination of such equipment means that the maintenance costs including cleaning and mixing, are substantially reduced. The present embodiments free up one or more monomer or monomer mixture portion of the system to permit the molding system to make laminate or over-molded parts and/or products by using the first shot to make a Nylon 6 or PBT core or layer and then at the appropriate time, having used the other monomer or monomer mixture equipment to make a second shot of polyurethane or PBT to produce a outer surface or second layer having enhanced properties including one or more of moisture absorption, smoothness, hardness level, etc. In other embodiments a strong thermoset core may be over-molded with a more impact resistant, tougher thermoplastic shell.

Optionally, all of the fiber and/or flake, and optionally the reactive filler(s) and/or pigment(s) and the monomer or monomer mixture are preheated to or near the desired polymerization temperature. When molds are involved, the molds may also be preheated at least above the melting point of the monomer when the monomer is solid at room temperature. After forming, the composite, in or out of the mold, may be placed in a hot environment to complete the polymerization to the desired degree. The total polymerization time will depend upon the temperature and degree of polymerization. For example, the polymerization reaction may take about 5 to about 15 minutes which may or may not include the up to about 10 minutes if the one or more polymerization activators are formed in situ on the fibers in the initial stage of impregnating the reinforcing fibers with the one or more monomers. In the latter case, if more time is needed to complete polymerization at the higher temperatures, another few minutes up to about 10 minutes may be taken because during this amount of time the reinforcements and mold temperature will be held at about 120° C. to first form the activator(s) before raising the temperature to the higher, polymerization temperatures.

Present embodiments also include methods of making reinforced polyamide 6 and/or PBT molding slugs or pellets for molding, and reinforced polyamide 6 and/or PBT composite parts in processes including RIM, VARIM, SRIM, pultrusion, filament winding and high pressure injection molding. In these methods two separate melting vessels may be used with one melting vessel melting a mixture of lactam monomer and one or more catalysts at 80-160° C. and the other melting vessel melting a mixture of cyclic poly(1,4 butylene terephthalate monomer and one or more catalysts at 150-160° C. These two melts are then directed in separate pipes to a mixing head where they are mixed thoroughly and then directed in a one or more pipes to a heated mold, the mold containing a fibrous preform, previously made from chopped fibers, rovings, nonwoven mat(s) or woven fabric(s). To reduce molding time, the preforms may be preheated to a temperature in the range of about 100 to about 220° C. before placing the preform into the heated mold. The mixed monomer, PI(s) and catalyst(s) impregnate the fibrous preform surrounding the fibers and polymerize due to the heat of the mold and preform at 160-180° C. for polyamide 6 and 170-210° C. for PBT, forming fiber reinforced polymide 6 composite. The amount of reinforcing fiber in these composites may be in the range of about 30 to about 80 wt. percent.

Some embodiments include methods that are a variation of the just described methods. The variation involves first sizing or coating the fibers with a sizing composition that includes one or more PI(s) for the caprolactam and PBT and then either chopping and drying the fibers or winding and drying the fibers before they are used to make the fibrous preforms. The sizing compositions may be solvent based, and may use solvents such as water as the liquid carrier, and may also contain one or more catalysts for the polymerization of caprolactam and/or PBT plus optionally other fiber sizing ingredients. For example, the sizing compositions may optionally contain one or more organo-silane coupling agents, optionally one or more lubricants to protect the fiber surface from scratching, gouging, etc. and may optionally contain one or more film formers for coating the fiber and bonding the other non-water ingredients to the surfaces of the fibers. The size may also contain enough PI to polymerize the mixture of monomer and catalyst that will be forced into the heated mold and heated fibrous preform. In this alternative method of making fiber reinforced polyamide 6 composites, only one melting vessel may be needed to melt the mixture of caprolactam and the one or more catalysts and this melted mixture may either go straight to the mold, or optionally may pass through a mixing head for better homogeneity.

As an alternative to the embodiments described just above, further embodiments include a sizing that contains a silane chemically bonded to a one or more PI(s) instead of the PI(s) and the optional organo-silane coupling agent being separate compounds. In these embodiments, the silane is chemically bonded to the fibers, particularly to fibers containing silica or a compound containing silica, and the PI will become bonded, often chemically bonded, to the polymer matrix providing for greater interfacial strength between the reinforcing fibers and the polymide 6 and/or PBT polymer matrix.

Further embodiments include a sizing that contains one or more precursors for the PI(s) and/or the catalyst(s). Where more than one precursor is used, one or more precursors may be present in the size composition, or one or more precursors may be present in a first size composition and the other precursor(s) may be present in a second size composition applied after the first size composition is applied with or without a drying step between the sizing applications. These sizes may also be applied to fibrous webs in the wet, nonwoven mat forming processes and the and dry, nonwoven mat forming processes disclosed earlier, and also to the woven fabric, all followed by drying.

An additional method of applying the sizing containing the polymerization initiator(s) to the reinforcing fibers includes a secondary fiber and/or flake, filler and pigment coating application. This secondary coating application may be prior to the fibers being chopped or wound, after the fibers are dried followed by another drying step, or when the fibers are used to make a nonwoven mat, nonwoven or woven scrim or woven fabric, the sizing may be impregnated into the mat, scrim or fabric or onto the flakes by spraying or passing a excess of sizing onto the mat, scrim or fabric with the excess passing through the mat, scrim or fabric to be collected and reused. In the case where the nonwoven mat is made by a wet process, the sizing may be applied, alone or in a binder mixture, to the wet web of fibers before drying the sized mat, and curing the binder if present. Where the mat is formed by a dry process the initiator sizing may be applied to the dry web, alone or in a binder mixture, followed by drying the mat, and curing the binder, if present.

Where the fiber preforms are made to shape by a wet process, the sizing containing the PI(s) may be in the water of the slurry, or may be sprayed onto the preform in excess after the wet preform has been formed and the excess sucked through the preform as in the mat, scrim and fabric application. Where the preform is made by hand lay-up or spray-up, the sizing containing the PI(s) with or without a binder, may be sprayed onto the collected chopped fibers, strands or rovings as the thickness of the preform is being built up.

Reactive flakes, such as glass flakes, and reactive particles, when used in the present embodiments may be prepared by spraying a size composition containing one or more PI(s) and/or one or more catalysts onto the flakes and/or particles while they are being stirred in a mixer that does not significantly degrade the flakes or particles, to disperse the size over the surfaces of the flakes and/or particles followed by drying the sized flakes and/or particles. This process may be repeated with a different sizing containing a catalyst or a precursor of either the PI(s) or the catalyst producing dry flakes having two layers of sizing coating the flakes.

The reinforcing fibers used in the present embodiments for making reinforced composites may include glass fibers, any of the glass types used for reinforcing polymers, and E glass. The reinforcing fibers need not be glass, nor do all of the fibers need to be glass. Other reinforcing fibers useful in place of all, or a portion of the glass fibers include, slag fibers, carbon fibers, ceramic fibers, alumina fibers, silica fibers, rock fibers including basalt fibers, asbestos, wollastinite fibers, fibrous talc, metal fibers and polymer fibers including fibers of aramid, polyester and polyethylene. Additionally, any combination of these fibers may also be used. Reactive fillers and/or pigments may also be used in place of or in addition to the reactive fibers and/or flakes, and with non-reactive fibers and/or non-reactive flakes. The fibers, flakes, filler particles and pigment particles may be of any material used to reinforce, texture, stabilize and/or color thermoplastic and/or thermoset composite parts or products.

Herein, when a range of number values is disclosed it is to be understood by those of ordinary skill in the appropriate art(s) that each numerical value in between the upper limit and the lower limit of the range is also disclosed, to at least 0.01 of a full number. Thus in a range of 1 to 10, this includes 2.04 to 10, 3.06 to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies may vary some beyond that stated so long as the advantages of the invention are realized. Practically, there is rarely the time or resources available to very precisely determine the limits of all the parameters of one's invention because to do so would require an effort far greater than may be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others may, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
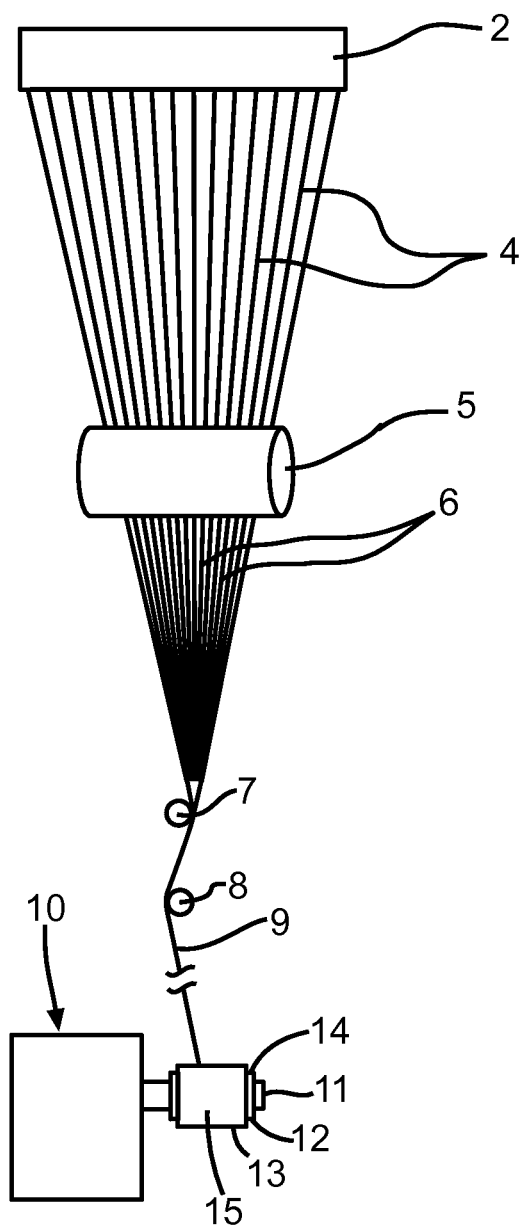
FIG. 1 is a simplified schematic drawing of a continuous glass fiber manufacturing system for making wound, reinforcing fiber products according to embodiments of the invention.

Present methods relate to processes for making a prepreg where the prepreg includes particles and a binder composition. The particles may be treated with a composition such as a catalyst or polymerization initiator (PI) that encourages the polymerization of the binder component under polymerization conditions. The binder component may include monomers and/or oligomers that are capable of undergoing additional polymerization when the prepreg is exposed to polymerization conditions.

Present embodiments may include treating particles with a compound represented by the formula Y—$(X)_n$-A wherein Y represents a coupling moiety for bonding with the surfaces of the fibers and/or flakes, e.g. glass, A represents a ring-opening polymerization catalyst or a PI moiety capable of participating in a ring-opening polymerization of a monomer when exposed to ring-opening polymerization conditions, and X represents a linking moiety capable of linking the Y moiety to the A moiety. The n is an integer ranging from zero to 3. When n is zero, the catalyzing moiety itself is capable of coupling with the reinforcement surface. In another version of this compound, Y could also be replaced with A, in which case it is not necessarily coupled to the reinforcement surface.

In exemplary embodiments, the coupling moiety Y may be a silane coupling moiety. The silane coupling moiety may comprise functional groups that react with the surface of the fibers and/or flakes, e.g. an organosilane group. The ring-opening PI or polymerization catalyst A may be an organic reactive group that participates in a ring-opening polymerization reaction, which includes anionic ring-opening polymerization, cationic ring-opening polymerization, and ring-opening metathesis polymerization (ROMP). For example, such reactive groups may participate in the polymerization by forming a reactive center where further cyclic monomers can join after opening to provide a larger polymer chain through ionic propagation.

In the present embodiments, the A moiety may be a group that serves the function of a ring-opening polymerization catalyst or PI in the anionic ring-opening polymerization of a lactam, e.g. caprolactam. In the anionic ring-opening polymerization of the lactam, the lactam monomer may be combined with a catalyst to produce a catalyzed monomer species. The ring-opening PI or polymerization catalyst A may react with the catalyzed monomer species to cleave the lactam ring and start the initial growth of the polymeric chain (i.e. Nylon-6). In one embodiment, the catalyst may comprise an alkyl metal salt of the lactam.

Additional catalysts that may be combined with the monomer species may include butylchlorotin dihydroxide, tetraisopropyl titanate, tetramethylammonium tetraphhenyl borate, compounds containing tertiary amines or quarternary ammonium salts, and organotin and/or organotitanate compounds. Tin-containing compounds may include monoalkyltin(IV) hydroxide oxides, monoalkyltin(IV) chloride dihydroxides, dialkyltin(IV) oxides, bistrialkyltin(IV) oxides, monoalkyltin(V) tris-alkoxides, dialkyltin(IV) dialkoxides, and trialkyltin(IV) alkoxides, among other tin-containing compounds. Exemplary titanium-containing compounds include titanate tetraalkoxide compounds (e.g., tetraisopropyl titanate) and tetraalkyl titanate compounds (e.g., tetra(2-ethylhexyl) titanate), among others.

Exemplary polymers that may be produced using the present embodiments include polyamides, polyesters, polyurethanes among others. Specific polymers may include polybutylene terephthlalate (PBT), polyethylene terephthalate (PET), polyamide-6 (PA-6), polyamide-12 (PA-12), polyamide-6,6 (PA-6,6), cyclic poly(1,4-butylene terephthalate) (CBT), polyurethanes (TPU), polymethylmethacrylate (PMMA), polycarbonates (PC), polyphenylenesulphide (PPS), polyethylenenapthalate (PEN), polybutylenenaphthalate (PBN), polyether etherketone (PEEK), and polyetherketoneketone (PEKK), and combinations of two or more of these polymers, among other polymers.

As another example, the A moiety may be a cyclic olefin-substituted imide group that undergoes ROMP under catalytic conditions with a cyclic olefin monomer using an alkylidene catalyst. Alkylidene catalysts may include rhodium, rhenium, or molybdenum catalysts developed by Schrock or Grubbs. Cyclic olefin monomers such a norbornene, cyclopentadiene, cyclooctadiene, decyclopentadiene, etc. may participate in the ROMP reaction to yield polymers. In this case the A moiety becomes part of the polymer chain.

Examples of PI(s) for polymerizing polyamides include N-hexamethyldiisocyanato-capped caprolactam, N-acetylcaprolactam, Isophthaloylbiscaprolactam, Isocyanatopropyltriethoxysilane-capped caprolactam and others including N-acyllactams, caprolactam esters and lactam-blocked isocyanates present in a range of about 0.5 to about 5 wt. percent of the monomer. Using these chemical systems results in fast polymerization reaction kinetics, clean polymerization without any by products and a crystalline polyamide 6 polymer.

Cross-linking and branching issues in the polymerization of Nylon 6, polyamide 6, may be avoided by the use of non-isocyanate polymerization initiators such as acyllactams in combination with a Grignard salt of caprolactam as a catalyst. Using such a system results in a rapid polymerization reaction kinetics, clean polymerization without any by products and a crystalline polyamide 6 polymer. An example of such a system is the use of N-acetyl caprolactam as the initiator To obtain a Grignard salt of lactam useful as a basic catalyst and a reagent for various reactions by one reaction operation safely, by reacting a metal Mg with an alkyl halide or an aryl halide and a lactam. A lactam shown by the formula I (R is 3-11C aliphatic hydrocarbon residue) is reacted with metal Mg and an alkyl halide or an aryl halide at −15-120° C., to give a compound shown by the formula II (n is 3-11; Y is Cl, Br, or I). Metal Mg having a small amount of oxidized film on the surface and >/=90% purity may be used as the metal Mg, and it may be in the form such as flake, powder, etc. having large specific surface area. A monohalogenated hydrocarbon may be used as the halogenated hydrocarbon, and the amount used may be 1.0-1.5 mol based on 1 mol metal Mg. An amount of the lactam used may be 0.9-5 mol based on μmol metal Mg.

Chemical sizings applied to the surfaces of the fibers, particularly glass fibers and/or glass flakes, may be used for particles containing silica and/or alumina, and/or other fibers, and may contain one or more of a lubricant, a film former and a silane coupling compound. The lubricant protects the surface of the fibers, which is essential to maximize the strength of the fibers from scratches, etc. caused by fiber-to-fiber rubbing abrasion and from processing equipment. The silane acts as the chemical linking agent by bonding to the glass fiber and also to the polymer/copolymer matrix. Silanes containing organosilane groups may be used as coupling agents for glass fibers and organic (e.g. polymer) phase, and serve to covalently bond the organic groups in the compound to groups on the inorganic surfaces. The optional film former provides the desired degree of bond between the fibers in the fiber strands to avoid fuzzing and excess filamentation during processing in the fiber manufacturers operations and/or in the composite manufacturers' operations. In the sizing compositions of the present embodiments the sizing also contains one or more ring-opening or PBT polymerization catalysts compounds, or one or more precursors thereof, and, in some embodiments, a linking compound capable of linking the silane compound and the PI/catalyst compound(s) or precursor(s) together and to the surfaces of the reinforcement(s). Examples of linking compounds are compounds containing a covalent bond, an alkyl group, an aryl group, an alkene group, an amine group, or a thiol group among other linking moieties, that will cause polymerization of the hot monomer mixture to form a polymer matrix around and bonded to the reinforcing glass fibers. Sizings may be applied to flakes by spraying the sizing onto the flakes in a fluid bed or mixer followed by drying.

The chemical sizing compositions used in the present embodiments may include a liquid carrier such as water, and either one or more PI(s) or one or more precursors of one or more PI(s) and may also optionally contain one or more other functional ingredients. The sizing may contain one or more silane coupling agents, one or more lubricants to protect the surfaces of the fibers from damage and one or more surfactants or wetting agents, etc. and may also optionally contain one or more resinous film formers for bonding the other ingredients to the fibers and also to provide a bond of desired strength between the many fibers in a strand formed by a plurality of fibers from the bushing 2.

The present embodiments may be applicable to a broad range of sizing compositions so long as each contains at least one PI or one catalyst for polymerization of either PBT or of polyamide 6 or at least one precursor for the at least one such PI or catalyst.

The sizing may include one or more coupling agents for chemically bonding the fiber to the polymer matrix. Suitable coupling agents may include aminosilanes, the reaction product of an aminosilane, maleic anhydride, ureidosilanes, vinylsilanes, and blends thereof. An exemplary silane is a product called A1100, available from OSI Specialties. This product contains 52% by weight active silane solids following hydrolysis. Another exemplary silane is a hydrolyzed A1100 solution in water, also available from OSI Specialties under the designation VS142 (40% solution) or from Huils under the designation A1151 (40% solution). In a scenario where one or more of the PI(s) or precursors are silanes, the majority of the coupling between the organic molecules and glass is effected by the PI(s) or the precursors. Additional coupling silanes may also be used.

The size compositions may further include one or more surface modifying or coupling agents selected from functional organo silane, organo titanate and organo zirconate coupling agents. The amount of functional organo-silane coupling agent may be about 1 to about 30 wt. percent, about 4 to about 20 wt. percent, or about 6 to about 12 wt. percent of the forming size composition on a total solids basis.

The size compositions may also contain one or more lubricants to protect the surfaces of the fibers and flakes and to aid manufacturing reducing friction where the wet fibers slide past, on or over guides and other physical objects. A small amount, usually no more than about 0.15 weight percent of the size composition of a lubricant compatible with the liquid in the sizing is used. Suitable lubricants for this purpose include one or more of the following: a nonionic surfactant such as a block copolymer of ethylene oxide and propylene oxide, e.g. LUVISKOL K grade and PLURONIC L101 (available from BASF of Florham Park, N.J.) or SYNPERONIC PE/IL101 (available from AkzoNobel of Morris, Ill.), polyethyleneimine polyamide salt, such as EMERY 6760 (available from Henkel Corp. of Rocky Hill, Conn.). octylphenoxypolyethoxyethanol such as TRITON X100 (available from Rohm and Haas of Philadelphia, Pa.); a polyvinyl pyrrolidone, e.g., an imidazoline, e.g., an alkylimidazoline derivative such as TEGO cationic softener (available from Th.Goldschmidt AG of Essen, Germany), amine salts of fatty acids, e.g., including a fatty acid moiety having 12 to 22 carbon atoms and/or tertiary amines having alkyl groups of 1 to 22 atoms attached to the nitrogen atom), alkyl imidazoline derivatives (may be formed by the reaction of fatty acids with polyalkylene polyamines), acid solubilized fatty acid amides (e.g., saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY 6717, a partially amidated polyethylene imine commercially available from Henkel Corporation of Kankakee, Ill. and ALUBRASPIN 226, available from PPG Industries, Inc. of Pittsburgh, Pa., alkyl imidazoline derivatives including CATION X, available from Goldschmidt Chemical Corporation (see above), and ALUBRASPIN 261, available from PPG Industries, Inc. (see above), and cationic lubricants such as silylated polyamine polymers prepared by reacting: (a) an amino functional reaction product of an aminofunctional polymer having primary or secondary amine functionality and the residue of a fatty acid moiety; and (b) an amine-reactable organo alkoxy silane and hydrolysis products thereof. Other lubricants include Emerset 2646 and Emerset 2661, available from Emery Industries of Waterloo, Iowa. When one or more lubricants are used in the sizing compositions the total amount of the one or more lubricants in the size composition may be about 0.1 to about 10 weight percent, about 0.5 to about 5 weight percent, or about 1 to about 3 weight percent of the forming size composition on a total solids basis.

The size compositions may also optionally include a film former for physically bonding the PI(s), PI precursor(s), catalyst(s) or catalyst precursor(s) to the fibers and flakes. Many film formers may be used including FULATEX PD-0166 and FULATEX PN-6019, both available from Fuller. FULATEX PN-6019 is a modified vinyl acetate copolymer in an anionic/nonionic surfactant system having a solids content of 53.5 to 55.5 weight percent; a pH of 3.5 to 4.5; VINAMUL™ 88127 or N.S. 25-1971 available from National Starch of Bridgewater, N.J. This copolymer contains from about 53.5 to 55.5 weight percent solids, and has a pH of 4 to 5. FULATEX PD-0166 and FULATEX PN-6019, which are both available from the H. B. Fuller Company of St. Paul, Minn. may be used. FULATEX PN-6019 is a modified vinyl acetate copolymer in an anionic/nonionic surfactant system with the following properties: solids content of 53.5 to 55.5 weight %; viscosity of 100 to 600 cps; pH of 3.5 to 4.5; and a residual monomer content of 0.5% or below. Another copolymer that may be used is VINAMUL™ 88127, which is available from Vinamul U.K. or from National Starch under the product code N.S. 25-1971. This copolymer contains from 53.5 to 55.5% by weight solids, has a pH of 4 to 5, and a viscosity of from 100 to 400 mPa s. The film-forming material may also be one or more N-vinyl amide polymers prepared from a cyclic monomer, for example N-vinyl-2-pyrrolidone, N-vinyl-2-piperidone, N-vinyl-.epsilon.-caprolactam, N-vinyl-5-methyl-2-pyrrolidone, N-vinyl-3,3,5-trimethyl-2-pyrrolidone, N-vinyl-3-methyl-2-pyrrolidone, isomers, derivatives and mixtures thereof. Epoxy film formers such as Neoxil™ 965, available from DSM Composite Resins AG of Schaffhausen, Switzerland are suitable as are polyurethane-based film formers including Hydrosize™ U1-01/U6-01 available from Hydrosize Technologies, Inc. of Raleigh, N.C. When one or more film formers are present in the size compositions the total amount of film former present may be about 0.5 to about 15 wt. percent, about 1 to about 10 wt. percent, or about 1 to about 5 wt. percent of the forming size composition on a total solids basis.

The size compositions may also optionally contain one or more of emulsifying agents, surfactants, plasticizers, film former modifiers, biocides and other size composition functional aids. The size may also include a pH adjusting agent, such as an acid or a base, in an amount sufficient to achieve a desired pH, for example, from about 6 to about 8.5. Exemplary acids include acetic, citric, sulfuric, phosphoric and similar acids. Exemplary bases include ammonium hydroxide and potassium hydroxide. Each size composition is applied to the fibers and flakes and then dried with the dried solids of the size being present on the fibers and flakes in an amount in the range of about 0.1 to about 5 wt. percent, based on the weight of the dry fibers and flakes. Additional ranges may include about 0.5 wt. percent to about 3 wt. percent and about 1 wt. percent to about 2 wt. percent, measured by a loss on ignition (L01) test of the fiber or flake products.

When one or more PI(s) are present in the sizing composition the amount of total PI solids in the sizing may be in the range of about 2 wt. percent, dry basis, to about 30 wt. percent. Exemplary ranges may include about 5 wt. percent to about 20 wt. and about 8 wt. percent to about 16 wt. percent. When one or more catalysts are present in the sizing, the amount may be in the range of about 2 wt. percent to about 20 wt. percent, dry basis. Exemplary ranges include about 5 wt. percent to about 15 wt. percent and about 8 wt. percent to about 12 wt. percent. As a further guide, below are a few of many possible sizing compositions.

Size Composition #1

| Ingredient | Weight % |
| --- | --- |
| Caprolactam silane[a] | 12 |
| Film former[b] | 1.2 |
| Lubricant[c] | 1.1 |
| Acetic Acid | 0.03 |

-continued

| Ingredient | Weight % |
| --- | --- |
| Ammonium Hydroxide | 0.04 |
| Deionized water | 85.63 |

[a]Choice of silanes such as reaction product of acryloyl caprolactam + aminopropyltriethoxysilane or acryloyl caprolactam + mercaptopropyltrimethoxysilane or methacryloyl caprolactam + amino/mercaptosilane or any other trialkoxysilane containing end group specified by 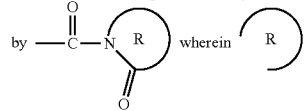

represents a C3 to C12 substituted or unsubstituted cyclic hydrocarbon chain.
[b]Choice of film formers such as Neoxil 965, Hydroside U-101/201/601 or any other Epoxy or PU-based film formers.
[c]Combination of one or more lubricants from Emerest 2646, Emerest 2661 and Emery 6717.

Procedure—
1. Add film former to ⅔rds of deionized water and stir in a mixing tank
2. Add caprolactam silane and continue stirring
3. Add acetic acid as necessary and continue stirring for an adequate period of time to ensure hydrolysis of silane (30 minutes-4 hours)
4. Add lubricants and mix for 5 minutes
5. Add rest of the DI water
6. Add ammonium hydroxide as necessary to ensure that the target pH (7-8.5) is achieved without affecting the sizing stability
7. Record solids % and pH Size Composition #2

| Ingredient | Weight % |
| --- | --- |
| Initiator for AP Nylon[1] | 11 |
| Caprolactam silane[a] | 1 |
| Film former[b] | 4 |
| Lubricant[c] | 2 |
| Acetic Acid | 0.01 |
| Ammonium Hydroxide | 0.01 |
| Deinoized water | 81.98 |

[1]Choice of initiators from acetyl caprolactam, isophthaloylbiscaprolactam, acryloyl caprolactam, methacryoyl caprolactam, benzoyl caprolactam, or any other initiator containing the end group specified by 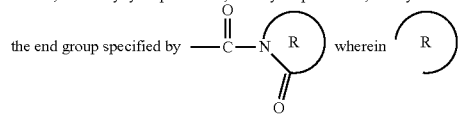

represents a C3 to C12 substituted or unsubstituted cyclic hydrocarbon chain.
[a]Choice of silanes such as reaction product of acryloyl caprolactam + aminopropyltriethoxysilane or acryloyl caprolactam + mercaptopropyltrimethoxysilane or methacryloyl caprolactam + amino/mercaptosilane or any other trialkoxysilane containing end group specified by wherein represents a C3 to C12 substituted or unsubstituted cyclic hydrocarbon chain.
[b]Choice of film formers such as Neoxil 965, Hydroside U-101/201/601 or any other Epoxy or PU-based film formers
[c]Combination of one or more lubricants from Emerest 2646, Emerest 2661 and Emery 6717.

Procedure—Similar procedure as Example 1 may be followed for liquid initiators wherein the initiator is added along with caprolactam silane. For solid initiators, the film former and water mixture is heated to 90° C. and the initiator is melted first before adding to the film former-water mixture. The contents are mixed well to ensure the formation of a stable dispersion of the initiator in water. The silane is then added and the rest of the procedure is followed as per Sizing number 1 above.

Size Composition #3:

| Ingredient | Weight % |
| --- | --- |
| Precursor for initiator for AP Nylon[2] | 8 |
| Aminopropyltriethoxysilane[a] | 1 |
| Film former[b] | 3 |
| Lubricant[c] | 2 |
| Acetic Acid | 0.01 |
| Ammonium Hydroxide | 0.01 |
| Deionized water | 85.98 |

[2]Chosen from a group comprising of aminopropyltriethoxysilane, mercaptoproyl-trimethoxysilane, acryloyl/methacryloyl caprolactam, ethyl benzoate or any other precursor molecules that in a secondary step react with another molecule such as caprolactam or others to produce an initiator on the surface of the glass.
[a]No additional silane is necessary if the precursor is a silane.
[b]Choice of film formers such as Neoxil 965, Hydroside U-101/201/601 or any other Epoxy or PU-based film formers.
[c]Combination of one or more lubricants from Emerest 2646, Emerest 2661 and Emery 6717.

Procedure—The procedure as disclosed in Example 2 is used. If aminopropyltriethoxysilane is used, the hydrolysis is rapid and acetic acid is not necessary.

The reinforcing fibers and/or flakes that may be used include any type of fiber product used to reinforce natural or organic polymers including chopped fiber strands or pellets (agglomerates), chopped fiber rovings, chopped strands from wound cakes and assembled rovings, gun roving, chopped or long slivers, nonwoven fibrous mats and woven fiber fabrics. The reinforcing fibers may be of any length. For example, the reinforcing fibers may be at least 0.06 inches long up to lengths exceeding 100 feet. The reinforcing fibers may be dry, but they may also contain up to about 0.5 wt. percent moisture or solvent. For example, the reinforcing fibers may contain less than 0.3 wt. percent moisture, less than 0.2 wt. percent moisture, or less than 0.1 wt. percent moisture.

In many of the embodiments, sized fibers and/or flakes are made and used as reinforcements in polymers formed in situ around the sized reinforcement fibers and/or flakes. One system and method useful in making the sized reinforcing fibers in a wound form is shown in FIG. 1. Fibers 1, including glass or polymer fibers, are formed by passing a molten form of the glass or polymer, etc. through orifices or nozzles on the bottom of a refractory metal bushing 2 heated to the fiberization temperature of the material being fiberized, and the fibers 4 are pulled rapidly downward at speeds exceeding 500-1000 ft./min. to more than 10,000 ft./min to attenuate the fibers to the desired diameter and to quickly cool the fibers 4 with air to below their softening point. A fine mist of water or other cooling fluid is sprayed onto the fibers to help cool them and the fibers 2 are then pulled into contact with a chemical sizing applicator such as a roller of a chemical sizing applicator 5 where the surfaces of the fibers are coated with a chemical sizing of the present embodiments, or another chemical sizing. The chemical sizings may be water based, but other liquids may be used in place of water including organic solvents including ketones, alcohols including ethanol, methanol, esters or others, molten caprolactam with or without an aqueous medium or a combination of water and organic solvents.

The chemically coated, wet fibers are next pulled into contact with a grooved pulley 7 that gathers all of the fibers 4 from the bushing 2 into one or more strands 9. A second grooved pulley 8, either offset from the first grooved pulley 7, or with the strand(s) 9 passing on an opposite side of the pulley 8, or both to provide some additional strand tension for a winder 10 located on the floor of the forming room below and offset from bushing 2. The fiber strands 9 may contain any number of fibers from a few hundred to more than 6000.

In systems for making continuous, wound sized fibers or sized fiber strands, the fibers 4 and the fiber strands 9 may be pulled at the desired speed by a winder, such as the roving winder 10 having a rotating spindle 11 and a removable sleeve 12 on which to wind a roving package 13 having square ends 14 and a relatively smooth outer diameter 15 of a desired size. Following completion of the roving package 13, the roving winder 10 indexes to place another rotating mandrel 11 into place containing a fresh sleeve 12 and the strand(s) 9, are transferred manually or automatically to the fresh sleeve to make another roving package 13 without disrupting the pulling of the strand(s) 9. Instead of a roving winder, a different type of winder for winding cakes, bobbins or other package shapes may be used in this system. After the wet packages, etc. are removed from the winder they are dried to remove all or most of the liquid carrier, to complete any coupling reaction(s) and to cure any film former in the sizing. The dried rovings or yarns are then processed to make the reinforcing fiber and reinforcing roving and yarn products to be used to weave fabrics, or to chop or to use to make fiber reinforced polymer composite products and parts.

Figure 2:
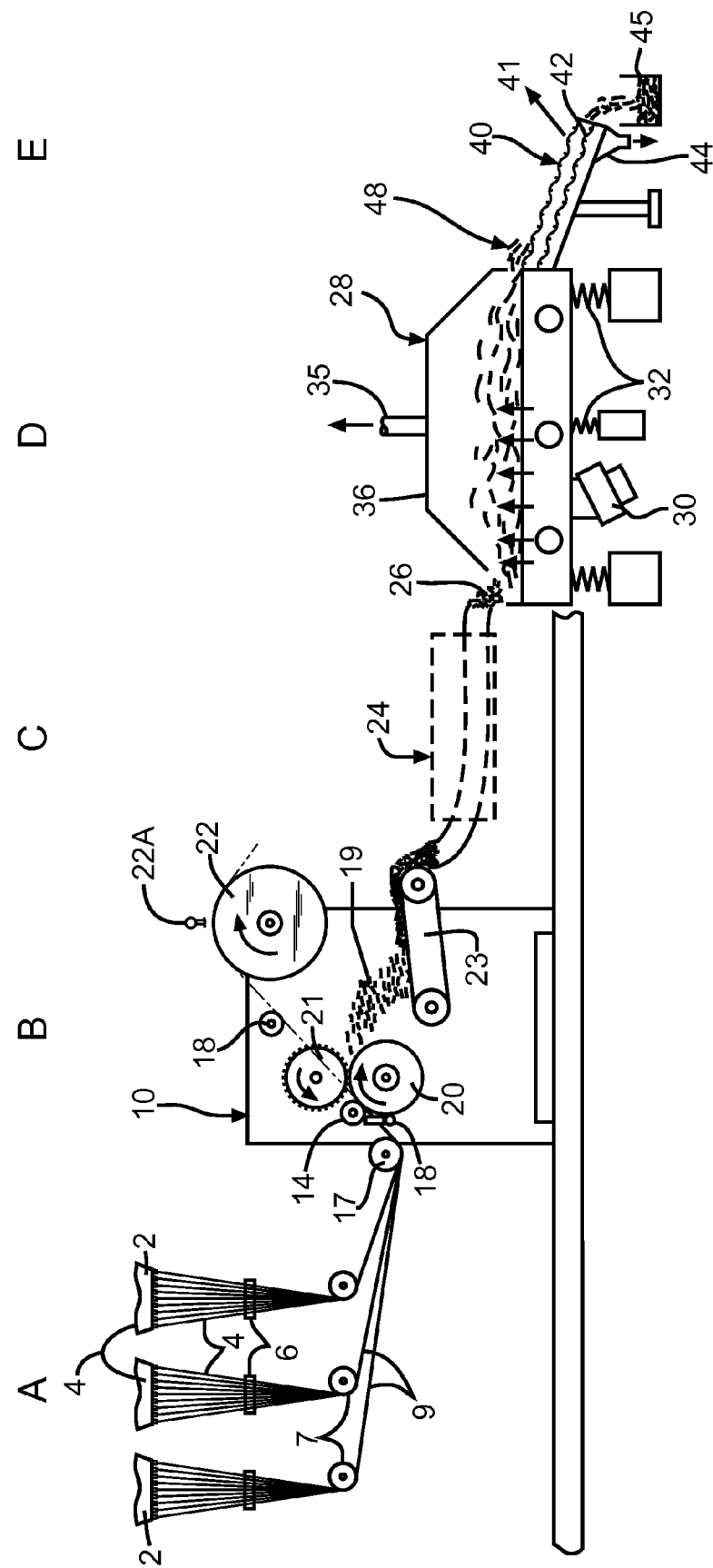
FIG. 2 is a simplified schematic drawing of a system for making desired lengths of chopped reinforcing fibers and fiber strands according to embodiments of the invention.

Other reinforcing fiber products used to make reinforced composite parts or products include wet and dry chopped sized fibers and wet and dry chopped fiber strands. FIG. 2 shows a system used to manufacture wet or dry chopped, sized fibers and fiber strands, or optionally agglomerated wet and dry chopped sized fibers and sized chopped fiber strand products. In FIG. 2, different system portions are labeled as A, B, C, D and E. Portion A is the fiber forming part of the system and may be the same as the fiber forming system shown in FIG. 1, except that in this system the fibers or strands of fibers 9 are pulled around gathering wheels 7 moving away from the turning wheels 7 in a generally horizontal orientation towards a chopper 16. Portion B is a chopper 16 for separating fibers and fiber strands 9 into lengths 19 of about 0.06 inch up to 5 inches long or longer with exemplary lengths being 0.125 inches, 0.25 inches, 0.5 inches, 0.75 inches, 1 inch, 1.25 inches, 1.5 inches, etc. The chopper 16 shown in FIG. 2 is comprised of a guide roll 17, a backup roll 20 with a pulling roll 19 running against it and fibers or fiber strands 9 on the surface of the backup roll. A blade or cutter roll 21 set to cause a plurality of blades mounted in the blade roll 21 to push against the fibers or fiber strands 9 on an elastomeric surface of the backup roll 20, penetrating the elastomeric surface to some depth results in producing the desired lengths of wet, sized fibers or fiber strands 9. Other components include elements for starting a new fiber or a new fiber strand into the chopper 16 without interrupting the running fibers or fiber strands 9 and comprise an accelerating roll 22, a sensor 22A to start the accelerator roll and a strand manipulator 18 to pull the new strand into the nip between backup roll 20 and the pulling roll 19 once the new fiber or fiber strand is running at a desired speed.

The chopped fibers and/or fiber strands 19 are collected on a conveyor belt or vibrating conveyor and may be either packaged wet, used wet close by, or further processed. Portion D is a drying part of the system. One option is to feed the wet, chopped fibers into a dryer like a vibrating fluid bed dryer 28, mounted on a plurality of springs 32 and equipped with one or more vibrators 30. The wet, chopped fibers and/or fiber strands are fed onto a perforated bed having holes therein of a size such that the fibers and/or fiber strands will not fall through, especially as hot air is flowing upward through the holes and into the vibrating, often suspended layer of chopped fibers and/or fiber strands to remove the liquid carrier, complete any coupling reaction(s) and to cure any film former that is on the surface of the fibers. The hot, moist air is exhausted through a stack 35 and a top cover 36 contains the fibers and fiber strands in the dryer 28.

Portion E is an optional sorting and packaging portion of the system. The hot, dry chopped fibers and/or fiber strands 48 may optionally flow into and through a size sorter 40 containing two or more screens 41 and 42 to remove any oversize and under size (fuzz) material from the desired product, discarding the material removed through a chute 44, and to cool the chopped, reinforcing fibers and/or fiber strands before being packaged in packages 45.

Portion C of the system is optional. When it is desired to produce pellets or agglomerates of the chopped fibers and/or fiber strands 19, the latter are fed into an optional agglomerator/pelletizer 24 that will agglomerate a plurality of the chopped fibers and/or fiber strands 19 into separate pellets or football shaped agglomerates and densify the pellets and/or football shaped agglomerates 26 before feeding them into the dryer 28. Optionally, the densified pellets and/or football shaped agglomerates 26 may be packaged wet for shipment or use on the premises.

Figure 3:
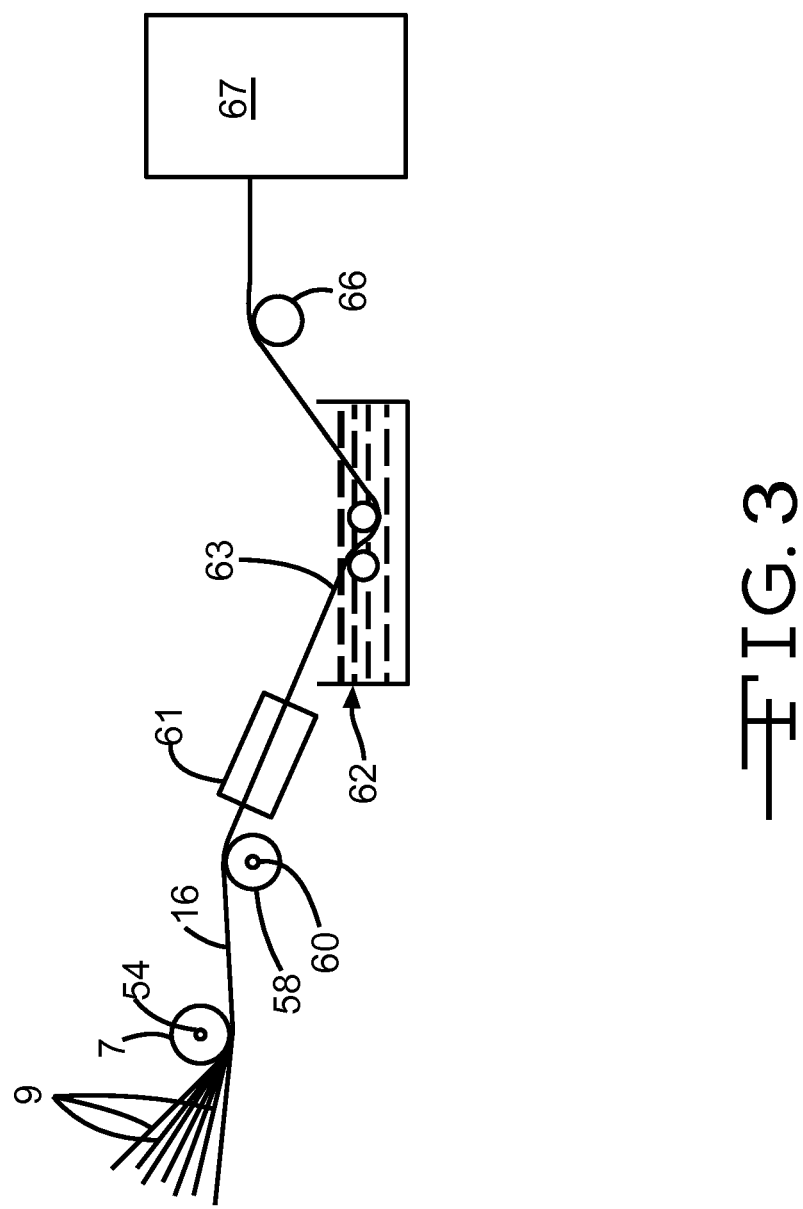
FIG. 3 is a simplified schematic drawing of a system for applying a second size composition to fibers or fiber strands according to embodiments of the invention.

Some of the sized, reinforcing fibers and/or fiber strands, particularly those using two or more precursors for the-PI(s) may use a two step sizing application using different size compositions in the two sizing steps. One system for use along with a system for making first sized fibers, including the systems shown in FIGS. 1 and 2, for making such dual sized fibers and/or fiber strands is shown in FIG. 3. Here wet, sized fibers 9 sized with a sizing composition, such as those coming from the systems shown in FIGS. 1 and 2, are gathered and turned with the turning roll 7 rotatable on an axle 54, then optionally onto a second roll 58 rotatable on an axle 60 and through a dryer 61 to optionally remove at least some of the liquid of the first sizing, and/or to gel the first sizing, and then onto other rollers 64 submerged in a different sizing in a container 62. The fiber(s) and/or fiber strands 65 coated with the second sizing composition are pulled from the container 62 by either a winder or chopper 67. From that point the wound or chopped sized fibers may be used, packaged wet or palletized, agglomerated and used or packaged or dried, optionally sorted, and packaged as described above in the description of FIGS. 1 and 2.

Other reinforcing fiber products include fibrous nonwoven mats and woven fiber fabrics using either the sized reinforcing fibers made in the systems disclosed above, or reinforcing fibers that are sized with the sizing compositions during manufacture of the nonwoven mats and fabrics. Weaving systems are used to weave fabrics and either wet or dry mat forming systems are used to make the fibrous, reinforcing nonwoven mats. Dry systems may include chopped strand mat systems and continuous fiber strand mat systems. These and other dry forming mat systems may be used.

Figure 4:
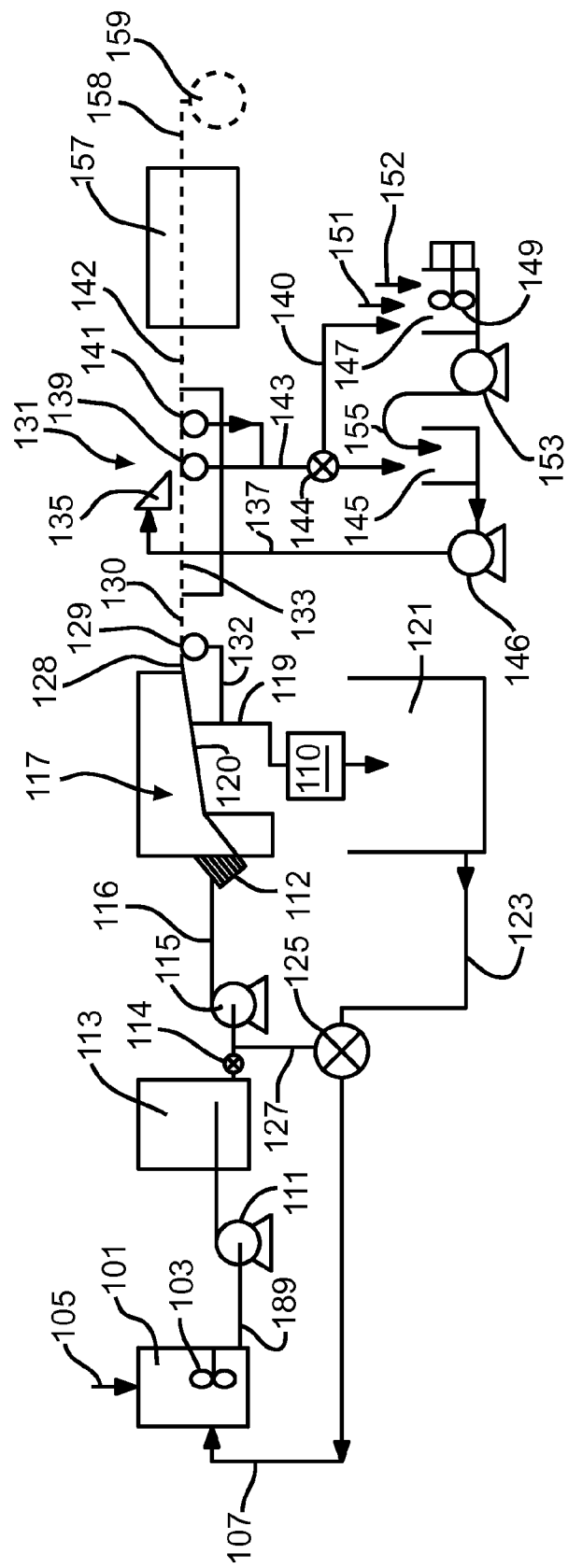
FIG. 4 is a simplified schematic drawing of a system for making a nonwoven mat and applying a sizing to fibers in the nonwoven mat according to embodiments of the invention.

FIG. 4 is a schematic of a wet former system for making multi-layer nonwoven mats except that it contains an optional second stock preparation system. Sized fibers or reinforcing fibers and/or fiber strands, particulate or both 105 are fed, for example, continuously, but batch type preparation may also be used, into a pulper 101 containing forming liquid, such as an aqueous forming liquid flowing in a return pipe 107. Mixing takes place in the pulper 101 with an agitator 103 to form a relatively concentrated slurry that exits the pulper 101 through pipe 109 and into a pump 111 that pumps the concentrated slurry into a holding tank 113. The forming liquid is delivered to pipe 107 by pump 125, pumping the forming liquid coming from a pipe 123 and a deairing tank 121. Concentrated slurry is metered out of the holding tank 113 by a pump 115 and variable flow valve 114 where the concentrated slurry is diluted substantially with the forming liquid coming through pipe 126 to a forming pump 127. The substantially diluted slurry, may have a solids concentration of less than about 0.04 percent, flows through pipe 116 to a distribution manifold 112 on a forming box 117.

The slurry flows toward a moving permeable forming belt 20 where the fibers and any particulates in the slurries are formed into a wet, nonwoven web while the forming water flows through the forming belt as return forming liquid 119 and onto the deairing tank 121. A final suction tube assembly 129 under the forming belt 120 near where the wet web is removed from the forming belt 120 removes excess forming liquid from the wet web and returns it through pipe 132 to the de-airing tank 121. The wet web is then transferred to a second moving permeable belt 130 that carries the wet web under an applicator 135, such as a curtain coater type, where a sizing, with or without a binder is applied in an application section 131. Excess sizing and/or binder is removed from the wet, fibrous web or mat with suction tube assemblies 139 and 141 to reduce the sizing and/or binder level in the wet web to the desired level. The coated web is then transferred to an oven belt 142 and passed through an oven 157 where the mat is dried and any film former resin(s) in the sizing and/or binder are cured. The dry mat 158 may then be wound into a roll 159 for packaging or use nearby.

The fibers in the mats containing an optional binder are bound together with a resinous binder, but the nonwoven mat need not contain any binder other than optional film former in the sizing. The binder is usually an aqueous mixture of water and one or more resins or polymers and other additives in a solution, emulsion or latex. The sizing, binder or combination is prepared by adding one or more ingredients 151 with a liquid 152, such as water, to a mix tank 147 containing an agitator 149. Excess binder, sizing or mixture removed from the wet web with suction boxes 139 and 141 may also be added to the mix tank 147 by way of return pipe 143. The mixed sizing, binder or mixture of the two is then pumped with pump 153 to a holding tank 145 to supply an applicator pump 146 that meters the sizing, binder or mixture of the two at the desired rate using variable valve 144 to the applicator 135.

Figure 5:
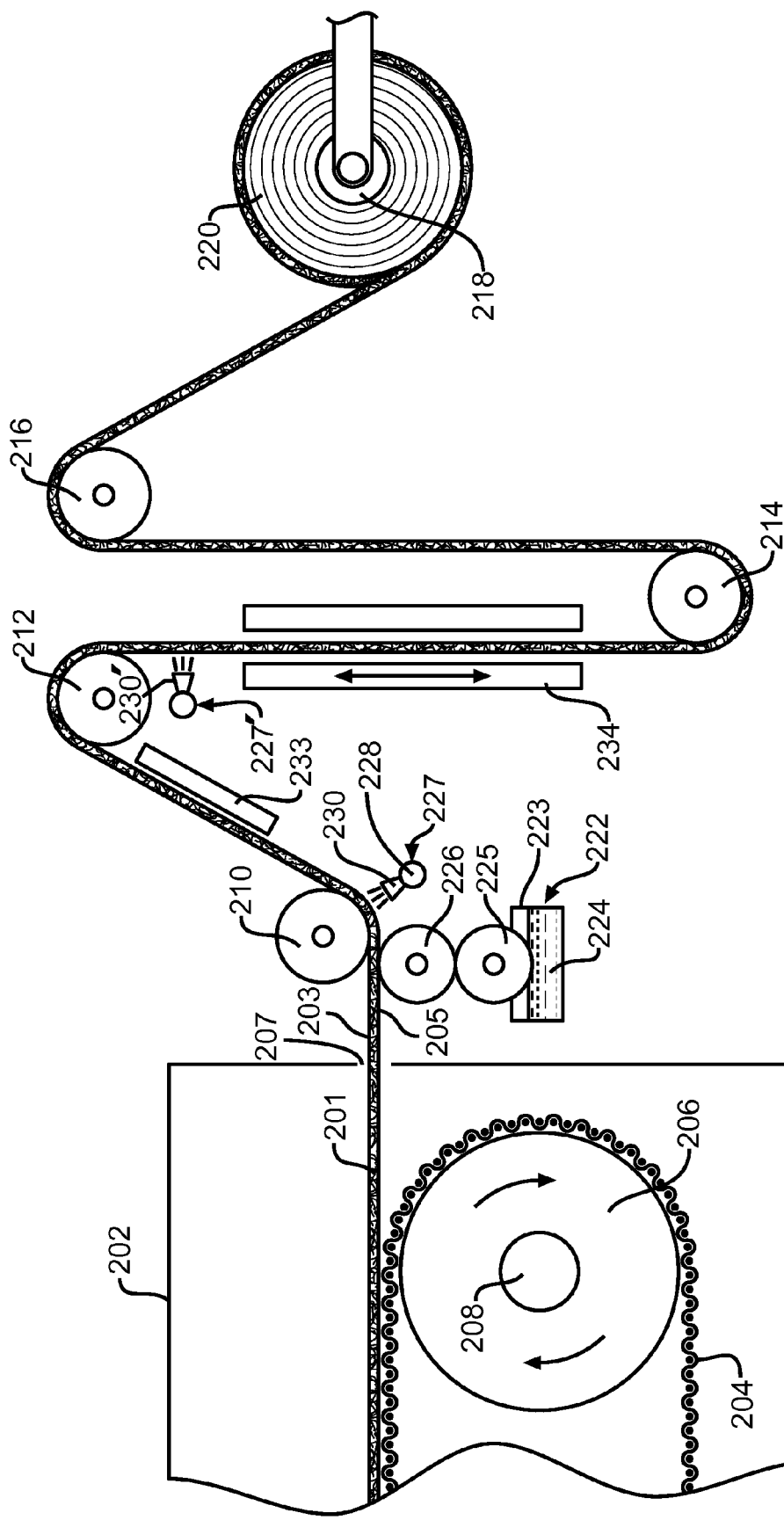
FIG. 5 is a simplified schematic drawing of a portion of a nonwoven mat system showing an additional system for applying a one or more sizings to a nonwoven fiber mat or to a woven fabric according to embodiments of the invention.
Figure 6:
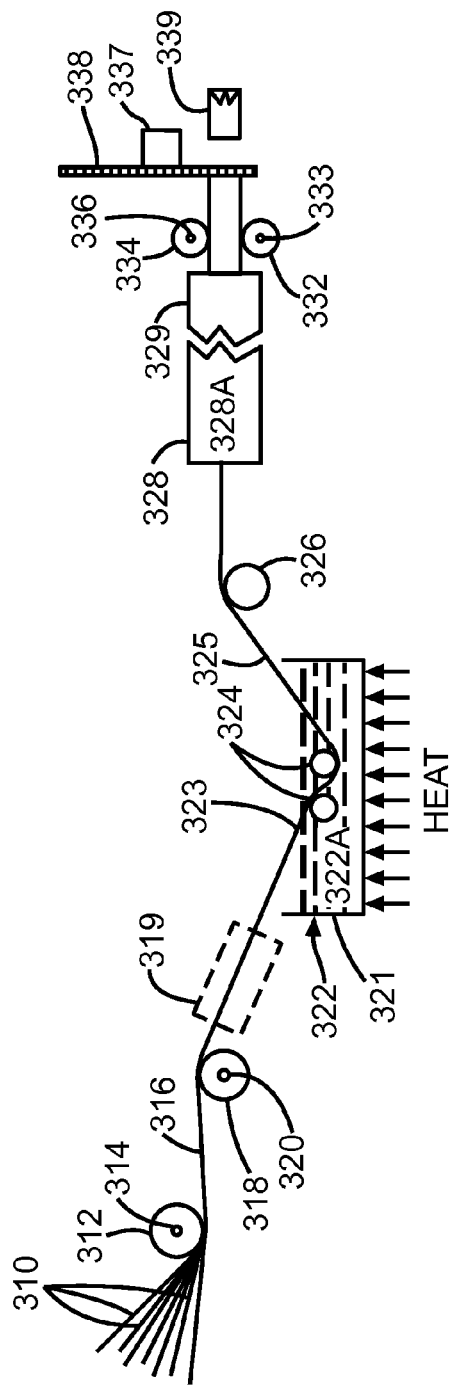
FIG. 6 is a simplified schematic drawing of a modified pultrusion system according to embodiments of the invention.
Figure 7:
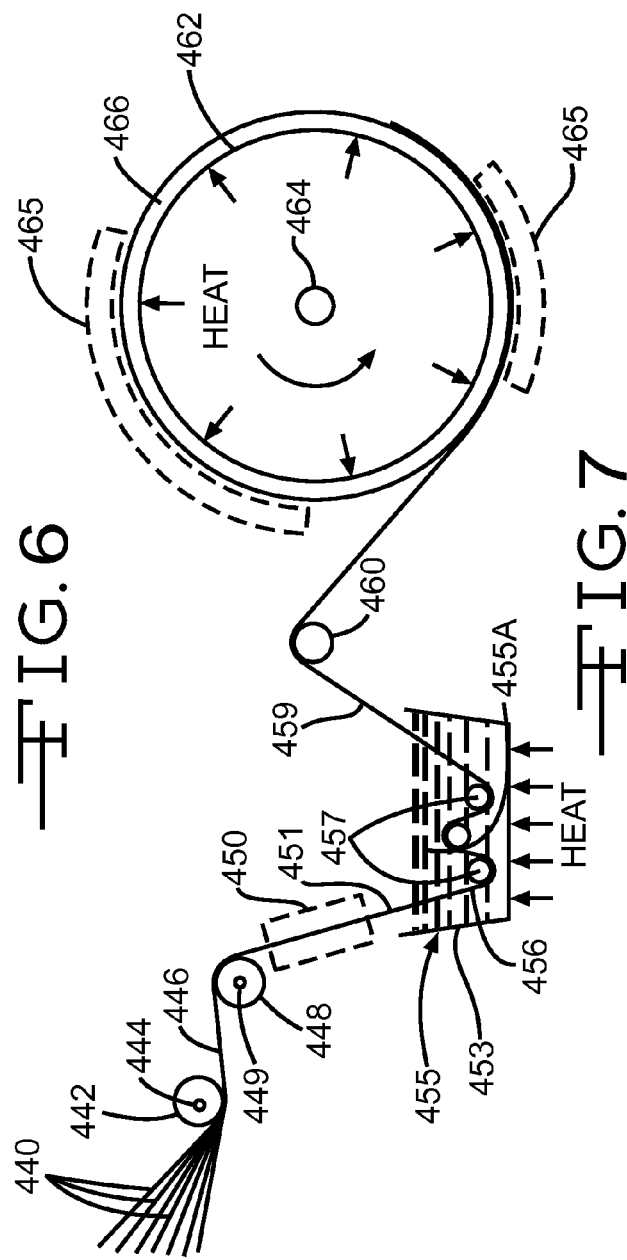
FIG. 7 is a simplified schematic drawing of a modified filament winding system according to embodiments of the invention.

In certain embodiments, a second sizing may be added to the fibers in a nonwoven mat or in a woven fabric. FIG. 5 shows another system useful in adding one or two sizing compositions to the reinforcement fibers in a nonwoven mat or a woven fabric. This system may be used as an alternative to the sizing application disclosed above in the description of FIG. 4, or in addition to that system to add a second sizing composition after the first sizing has been dried on the fibers in the nonwoven mat. For woven fabrics, the system of FIG. 5 may be used to add one or two different sizing compositions to the woven fabric as the fabric comes off of the loom, or in a separate step.

When used with the wet process in FIG. 4, a dryer chain/screen 204 carries the wet to dry, hot nonwoven mat 201 through the dryer 200 driven by a tail pulley 206 mounted on axle 208. The hot, dry mat 203 exiting the dryer is then wound up into rolls 220 on a mandrel 218 supported by arms 219 of a winder, such as an indexing winder. Other rolls 212, 216 and at least one movable accumulator roll 214 provide enough slack to allow the winder to doff the mat, rotate a finished roll 220 out of position and a fresh mandrel into winding position to start winding a new roll 220. Nonwoven mats may also be made by a dry process and mats made by dry processes may include dry chopped fiber mats and continuous filament mats.

The woven or nonwoven fibrous mats may be very permeable due to the many relatively large pores in the surface and throughout the mats. The permeability of these mats is in the range of about 50 to about 1500. For example, the permeability of the mats may be in the range of about 175 to about 1000 or about 200 to about 800 cubic feet per minute per square foot (ASTM D737 test method).

Referring to FIG. 5, instances where the bottom surface of nonwoven mat, woven or nonwoven scrim and/or woven fabric 203, coming out of an oven 200 as the final step in the process of making such fibrous materials, may be coated with a size composition, such as using a roll over roll coater 223. In a roll-over-roll coater 223 a first roll 225 rotates in a pan 222 containing the liquid size 224, a liquid, where the liquid may be a water medium, and picks up a layer of the size 224 on the surface of the roll 225 and transfers the layer of size 224 to a second, coating roll 226. The coating roll 226 "kisses" the back side of the mat or fabric 203 transferring the size to the fibers, and optionally binder coated fibers, in the mat or fabric. The amount of size applied to the mat or fabric may be controlled by adjusting the concentration of the size 224 and by controlling the amount of liquid size picked up by the first roll 225. The size quickly is moved through the mat or fabric by the size wanting to wet the fibers and then heating with one or more heaters 233, such as a hot air heater, drives off the water or solvent in the sizing, leaving the caprolactam Pl on the fibers or the cured binder coating the fibers. The penetration of the surfactant into the mat or fabric to the opposite surface is complete by varying one or more of the non-isocyanate PA concentration in the size 224, the amount of size applied to the mat or fabric 203, the temperature of the hot air in the one or more dryers 233 and the speed of the tail pulley 206.

If additional or more size is desired on the mat or fabric than may be applied with the coater 223, one or more optional other coating devices 227 may be used, either in the place of the coater 223 or in addition to the coater 223. For example, one or more spray jet coaters 227 comprised of a manifold 28 and spaced apart jet nozzles 30 may be used. For example, jet nozzles that form a mist or atomize the size 224 may be used. This system may also be used to apply a size containing one or more precursors for the non-isocyanate PA to the mat or fabric 203.

In the embodiments requiring the fibers in the mat or fabric 203 to have a second size containing a different non-isocyanate compound PA or precursor for such applied prior to final drying, a second set of size applicators 227" are shown followed by one or more secondary dryers 234. The dryers 233 and 234 may be located adjacent both surfaces of the mat or fabric 203 if desired. The dryers may be of any suitable type, such as hot forced air heaters, surface combustion heaters or infra-red heaters. In cases where size transfer doesn't matter, it is not necessary that the mat or fabric be completely dry prior to winding into the roll 220, or prior to stacking sheets of the mat or fabric together. Where it is beneficial to apply size 224 to the top surface of the mat or fabric 203, the application equipment is arranged to coat that side instead of the bottom side using for example, jet spray applicators 227, 227".

Reactive glass for PA, PBT, PU, and other thermoplastics and thermosets may be used as the reinforcing material to create composites using the reactive injection process in a one-pot system. The present embodiments free up one or more monomer or monomer mixing portions of the system to permit the molding system to make laminate or over-molded parts and/or products by using the first shot to make a Nylon 6 or PBT core or layer and then at the appropriate time, having used the other monomer or monomer mixture equipment to make a second shot of polyurethane or PBT to produce a outer surface or second layer having enhanced properties including one or more of moisture absorption, smoothness, hardness level, etc. In other embodiments, a strong thermoset core may be over-molded with a more impact resistant, tougher thermoplastic shell. The examples will describe some of the options for making different composite laminates and parts using a multi-component system wherein the filler, pigment and/or the reinforcing material is reactive and may be for example, a glass material.

Example 1

This example uses one or more of nonwoven mat, scrim, chopped strand mat, or any kind of woven fabric, all made using reactive fibers having one or more S-A-X compounds chemically bonded to the surfaces of the fibers, such as glass fibers. In this example a woven fabric but made using dry direct wound rovings of reactive glass fibers, i.e. glass fibers having about 0.7 to about 3 wt. percent, based on the dry weight of the fibers, of a S-A-X compound,

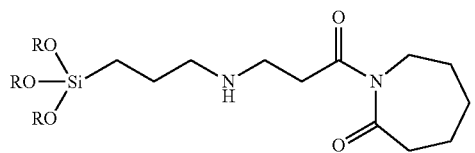

chemically bonded to their surfaces and made by the process shown in FIG. 1. This woven fabric was coated with a molten mixture having a temperature of about 80° C. (within a range of about 65 to about 90° C.) and containing about 96-99 wt. percent of caprolactam monomer and about 1-4 wt. percent of the catalyst, magnesium bromide-caprolactam, using a coating process. The amount of coating mixture on the woven fabric was about 20-50 wt. percent based on the final weight of the prepreg. This prepreg was then cooled to and/or stored at a temperature below about 30° C. Separator sheet(s) were used to keep the prepreg from sticking to itself or something else, and the pregreg was stored in an essentially moisture free, or low humidity, environment. When ready to mold the prepreg sheet was cut to length or shape and placed in a mold heated to a temperature in the range of about 150 to about 180° C. in a press having heated opposed top and/or and bottom platens fitting the outlines of the mold and the prepreg was pressed to form the desired shape, to consolidate the prepreg and to polymerize or partially polymerize the caprolactam to polyamide 6. The cured or partially cured part or product was removed from the mold and cooled if fully polymerized, or if only partially polymerized to the point of maintaining its shape and dimensions, was put into an oven having a temperature in the range of about 160 to about 170° C. until fully polymerized.

The prepregs may also be used in forming laminates of different compositions such as different internal reactive reinforcements and/or flakes and/or particles for providing different properties and/or having different coating compositions for providing different colors, textures and different properties. The prepregs are also usable in various processes including laminating processes, RTM, RIM, VARTM and others used to form prepregs into composite parts and products.

Glass fibers with or without flakes in the form of either a reactive woven fabric or reactive non-woven mat or a combination of both were fed onto a separator sheet moving on the conveyor belt of the prepreg forming system. Several layers of fabric or mat were used to achieve a glass loading of >50%. The glass contained 1 to 3% by weight of triethoxypropylsilane isocyanate-capped caprolactam residue PI on the reinforcement surfaces bonded to the glass via the silane linkage. Next a mixture of caprolactam and sodium caprolactam catalyst (1-3% by weight with respect to caprolactam) having a temperature of about 80° C., within the desired range of about 65° C. and about 90° C., was spread onto the reactive glass fibrous material as it moved along, a separator sheet was fed onto the top of the monomer mixture and then this moving mass was moved through a plurality of opposed compacting rolls to force the monomer mixture into the reinforcing material and to wet out the reactive glass fibers. The resultant prepreg sheet was then cooled and rolled up into rolls of desired length and placed into a cooler to cool and maintain their temperature below about 30° C.

This prepreg was then cut to the desired shape for molding, placed into a mold maintained at 160° C. and pressed to form and polymerize for about 4-10 minutes. The resultant product was a glass reinforced Nylon 6 composite.

A variant of this example is that of making a glass fiber reinforced PBT composite. In this case, the glass fibers have on their surfaces 0.5-3 wt. %, based on the dry weight of the fibers, of chlorobutyltindihydroxide catalyst. Cyclic butylene terephthalate monomer was then pressed into the reactive glass fiber fabric using the system described just above, cooled to a temperature below about 30° C. and stored as above. Polymerization was allowed to occur in the mold at 190-210° C. for 4-10 minutes to produce a glass fiber reinforced PBT composite. In this and all embodiments complete polymerization does not have to take place in the mold. Instead, where the mold remains in the press, only sufficient polymerization to maintain the shape of the pressed composite may be needed and the rest of the polymerization may take place in an oven or autoclave.

Example 2

Glass fibers with or without flakes in the form of either a reactive woven fabric or scrim or reactive non-woven mat or a combination of these were fed onto a separator sheet moving on the conveyor belt of the prepreg forming system. Several layers of fabric or mat were used to achieve a glass loading of >50%. The glass contained 1 to 3% by weight of triethoxypropylsilane isocyanate-capped caprolactam residue PI on the reinforcement surfaces bonded to the glass via the silane linkage. Next a mixture of molten caprolactam and sodium caprolactam catalyst (1-3% by weight with respect to caprolactam) having a temperature of about 80° C., within the desired range of about 65° C. and about 90° C., was spread onto the reactive glass fibrous material as it moved along, a separator sheet was fed onto the top of the monomer mixture and then this moving mass was moved through a plurality of opposed compacting rolls to force the monomer mixture into the reinforcing material and to wet out the reactive glass fibers, and this prepreg sheet was cooled to below about 120° C. Next the top separator sheet was removed and a molten mixture of caprolactam and a catalyst was spread over the top of the first prepreg sheet, a top separator sheet applied and again this mass was run through a set of compactor rolls to press the second monomer mixture into the fibrous material, and then cooled to below 120° C. producing a solid prepreg for rolling up or cutting to length in sheets. This dual prepreg was then molded as in Example 1 to form and polymerize forming a reinforced, thermoplastic polyamide composite.

Example 3

After non-reactive glass fiber fabric and nonwoven mat and glass veil mats, all being at a temperature below about 120°

C., are fed onto a separator sheet on the moving belt, a molten mixture of caprolactam and a catalyst and PI for the anionic polymerization to form Nylon was spread onto this non-reactive fibrous mass and covered with a separator sheet, and this mass was run through a plurality of compacting rolls to force the mixture into the fibrous mass and wet out the glass fibers and this prepreg was cooled to below 120° C. This prepreg was capable of being molded and polymerized upon heating to form a reinforced Nylon composite.

The anionic polymerized Nylon (AP Nylon) prepregs provide a hitherto unforeseen option to manufacturers of composite parts. Instead of processing the AP Nylon composite using monomer/catalyst/PI mixtures, the manufacturers of composites only need purchase, or make, and use the solid prepregs of the present embodiments to produce composites, without having to work with equipment for resin melting, injection, and other components as is the present routine. This will substantially reduce these manufacturers' costs of making reinforced or unreinforced thermoplastic and/or thermoset composites and composite laminates.

Example 4

A prepreg was made using the procedure in Example 2 except for the following details. A first prepreg was made containing glass fibers sized with a silane based PI compound for caprolactam polymerization in the form of a first non-woven veil mat on the bottom and a chopped strand mat on top of the veil mat. The silane based PI was the reaction product of mercaptopropyltrimethoxysilane and acryloyl caprolactam and is present in the range of 1 to 3 wt. % based on the dry weight of the glass fibers, on the glass fiber surfaces as a dry residue. A molten caprolactam mixed with a magnesiumbromide-caprolactam catalyst (2 to 4% by weight) was then spread over the top of the chopped strand mat and, with a separator sheet paid out on top of the caprolactum was run through a set of opposed compacting rolls, cooling the prepreg in the process. Following the last set of compacting rolls the top separator sheet was continuously removed from the prepreg first layer and a woven fabric comprised of woven glass fiber yarn was paid out continuously onto the top of the first layer followed by a spreading of a mixture comprised of molten cyclic-butylene terephthalate monomer and a tetra-isopropyl titanate catalyst (0.3 to 2% by weight) over the top of the fabric. A separator sheet was then paid out over the top of this mass and it was run through another group of opposed compacting rolls while cooling to bring the laminate prepreg temperature down to below 30° C. The resultant laminate prepreg was then rolled into a roll and placed in storage kept below this temperature until ready for shipment or molding. This laminate prepreg may then be molded at 190-210° C. for 4-10 minutes to form a laminate of reinforced PBT over-layer on top of the reinforced polyamide layer. This sandwich structure having the benefit of a tough, reinforced polyamide layer covered by a strong, reinforced PBT shell layer. In a modification of this example, the glass fibers in the yarn fabric could have been sized with a sizing containing the titanate catalyst on their surfaces, avoiding having to add this to the molten CBT monomer.

Example 5

A mixture of 94-97.2% caprolactam monomer, 0.8-2% acetyl caprolactam initiator and 2-4% MgBr-caprolactam catalyst is thoroughly mixed in the solid form using a tumble mixer or a drum mixer. Glass fibers in the form of woven fabric or scrim or non-woven mat or a combination of these are placed in a press which is heated to 60-80° C. The powder mixture is then dispersed over the fibers with the fibers making up 50-80% of the total weight of the combination. The powder mixture is then pressed in to the fabrics at a temperature of about 70° C. which causes enough softening of the monomer mixture to form a coated prepreg on the glass. The resultant prepreg sheet was then cooled end rolled up into rolls of desired length and placed into a cooler to cool and maintain their temperature below about 30° C.

This prepreg was then later cut to the desired shape for molding, placed into a mold maintained at 160° C. and pressed to form and polymerize for about 4-10 minutes. The resultant product was a glass reinforced Nylon 6 composite. Instead of a press and a separate cooling step, a continuous double belt press with integrated heating and cooling could be used.

Example 6

A variation of example 5 incorporates a reactive glass fiber sized with 1-3% of hexamethylenediisocyanato-capped caprolactam initiator. Herein the monomer mixture comprises of 97-99% caprolactam and 1-3% sodium caprolactam catalyst. The process for creating the prepreg and further molding is similar to that in example 5.

A variant of this example is that of making a glass fiber reinforced PBT composite. In this case, the glass fibers have on their surfaces 0.5-3 wt. %, based on the dry weight of the fibers, of chlorobutyltindihydroxide catalyst. Cyclic butylene terephthalate monomer was then pressed into the reactive glass fiber fabric using the system described just above at about 140° C., cooled to a temperature below about 30° C., and stored as above. Polymerization was allowed to occur in the mold at 190-210° C. for 4-10 minutes to produce a glass fiber reinforced PBT composite.

Example 7

A mixture of monomer powder, monomer flakes or liquid monomer is put together with reinforcing fibers, fillers or other types of reinforcements into a dumpling mixer with internal or external heating. (Equipment similar to burning chalk in the concrete process, continuous pipe with heating capability). The monomer is heated up to get in the liquid face and is put into the contact with the reinforcement material. In the last part of this turning pipe the material is still moved forward and cooled down to form a solid material. Through the dumpling movement irregular shaped pellets or slugs are produced for further use.

A multitude of other embodiments are possible including, but not limited to, using reactive fillers and pigments in place of or in addition to the reactive fibers and/or flakes and with non-reactive fibers and/or flakes. The fibers, flakes, filler particles and pigment particles may be of any material used to reinforce, stabilize and/or color and/or to texture thermoplastic and thermoset composite parts or products.

What is claimed is:

1. A method of making a prepreg comprising particles and a binder composition, the method comprising:
   a) placing the particles on a moving conveying belt and applying the binder composition to the particles on the moving conveying belt to form a moving mass; and
   b) passing the moving mass through one or more pairs of opposed, compacting rolls, wherein the particles and the binder composition are pressed into further contact while passing through the compacting rolls to form the prepreg, wherein the binder composition in the prepreg comprises monomers and/or oligomers of a thermoplastic polymer that are capable of polymerizing into the polymer under polymerization conditions, and wherein the binder composition is not significantly polymerized.

2. The method of claim 1, wherein the particles comprise at least one of fibers or flakes.

3. The method of claim 1, wherein the particles comprise glass.

4. The method of claim 1, wherein the particles comprise at least one polymerization compound selected from the group consisting of a polymerization initiator and a polymerization catalyst.

5. The method of claim 1, wherein the binder composition comprises the monomers and/or the oligomers of a caprolactam compound.

6. The method of claim 1, wherein the binder composition comprises the monomers and/or the oligomers of cyclic butylene terephthalate.

7. The method of claim 1, wherein the binder composition comprises the monomers and/or the oligomers of a cyclic olefin compound and the polymerization is a ring-opening metathesis polymerization.

8. The method of claim 1, wherein the prepreg comprises a colored and/or non-colored layer.

9. The method of claim 1, wherein the moving mass of the particles and the binder composition does not stick to the compacting rolls while passing through the one or more pairs of opposed, compacting rolls.

10. The method of claim 1, wherein the method further comprises:
cooling the prepreg to, or holding the prepreg at, a temperature below which significant polymerization will take place while the prepreg awaits heating, molding and polymerization to make a finished composite part or product.

11. The method of claim 1, wherein following the formation of a first prepreg layer in step (b) the method further comprises:
applying monomer and/or oligomer onto the top surface of the first prepreg layer to form a second mass; and
running the second mass through one or more pairs of opposed compacting rollers to force the monomer and/or oligomer into contact with the binder composition from the first prepreg layer, wherein the contact of the monomer and/or oligomer with the binder composition forms a laminate prepreg comprising a second layer formed on top of the first prepreg layer.

12. The method of claim 11, wherein the method further comprises:
applying additional particles to the top of the first prepreg layer prior to applying the monomer and/or oligomer onto the top surface of the first prepreg layer, wherein running the second mass through one or more pairs of opposed compacting rollers presses into further contact the additional particles with the monomer and/or oligomer applied to the top surface of the first prepreg layer.

13. The method of claim 12 wherein the additional particles are made reactive by having a polymerization initiator and/or a polymerization catalyst introduced to the additional particles before the particles are applied to the top of the first prepreg layer.

14. A method of making a prepreg comprising particles and a binder composition, the method comprising:

a) placing the binder composition on a moving conveying belt and applying the particles to the binder composition on the moving conveying belt to form a moving mass; and b) passing the moving mass through one or more pairs of opposed, compacting rolls, wherein the binder composition and the particles are pressed into further contact while passing through the compacting rolls to form the prepreg, wherein the binder composition in the prepreg comprises monomers and/or oligomers of a thermoplastic polymer that are capable of polymerizing into the polymer under polymerization conditions and wherein the binder composition is not significantly polymerized.

15. The method of claim 14, wherein the particles comprise at least one of glass fibers or glass flakes, and wherein the particles comprise at least one polymerization compound selected from the group consisting of a polymerization initiator and a polymerization catalyst.

16. The method of claim 14, wherein the binder composition comprises the monomers and/or the oligomers of a caprolactam compound.

17. The method of claim 14, wherein the binder composition comprises the monomers and/or the oligomers of cyclic butylene terephthalate.

18. The method of claim 14, wherein the binder composition comprises the monomers and/or the oligomers of a cyclic olefin compound and the polymerization is a ring-opening metathesis polymerization.

19. The method of claim 14, wherein following the formation of a first prepreg layer in step (b) the method further comprises:
applying monomer and/or oligomer onto the top surface of the first prepreg layer to form a second mass; and
running the second mass through one or more pairs of opposed compacting rollers to force the monomer and/or oligomer into contact with the binder composition from the first prepreg layer, wherein the contact of the monomer and/or oligomer with the binder composition forms a laminate prepreg comprising a second layer formed on top of the first prepreg layer.

20. The method of claim 1, wherein the particles comprise greater than about 50% of the prepreg.

21. The method of claim 1, wherein a residue of a polymerization initiator or catalyst is chemically or mechanically bonded to the particles.

22. The method of claim 1, wherein during the application of the binder composition to the particles, the binder composition has a temperature between about 65° C. and about 90° C.

23. The method of claim 1, wherein during the application of the binder composition to the particles, the binder composition has a temperature of about 80° C.

24. The method of claim 1, wherein the method further comprises treating particles with a compound represented by the formula Y—(X)$_n$-A, wherein:
Y represents a coupling moiety for bonding with the particles,
A represents a ring-opening polymerization catalyst or a polymerization initiator moiety capable of participating in a ring-opening polymerization of a monomer when exposed to ring-opening polymerization conditions,
X represents a linking moiety capable of linking the Y moiety to the A moiety, and
n is an integer ranging from 0 to 3.

* * * * *